US012580447B2

(12) United States Patent
Speziali

(10) Patent No.: US 12,580,447 B2
(45) Date of Patent: Mar. 17, 2026

(54) ELECTROMECHANICAL SPINDLE DRIVE

(71) Applicant: TRUMPF Maschinen Austria GmbH & Co. KG., Pasching (AT)

(72) Inventor: Stefano Speziali, Foligno (IT)

(73) Assignee: TRUMPF Maschinen Austria GmbH & Co. KG., Pasching (AT)

( * ) Notice: Subject to any disclaimer, the term of this patent is extended or adjusted under 35 U.S.C. 154(b) by 290 days.

(21) Appl. No.: 18/276,108

(22) PCT Filed: Feb. 22, 2022

(86) PCT No.: PCT/AT2022/060049
§ 371 (c)(1),
(2) Date: Aug. 7, 2023

(87) PCT Pub. No.: WO2022/178564
PCT Pub. Date: Sep. 1, 2022

(65) Prior Publication Data
US 2024/0128832 A1      Apr. 18, 2024

(30) Foreign Application Priority Data

Feb. 23, 2021     (AT) .............................. A 50123/2021

(51) Int. Cl.
*H02K 7/00*          (2006.01)
*F16H 25/22*         (2006.01)
          (Continued)

(52) U.S. Cl.
CPC ......... *H02K 7/003* (2013.01); *F16H 25/2228* (2013.01); *H02K 1/2706* (2013.01);
          (Continued)

(58) Field of Classification Search
CPC ............. F16H 2025/2078; F16H 25/20; F16H 25/2204; F16H 25/2228; F16H 25/22;
          (Continued)

(56) References Cited

U.S. PATENT DOCUMENTS 3,161,074 A    12/1964   Korthaus et al.
3,206,628 A     9/1965   Korthaus et al.
          (Continued)

FOREIGN PATENT DOCUMENTS

DE        1 173 758 B      7/1964
DE        1 190 759 B      4/1965
          (Continued)

OTHER PUBLICATIONS

WO-2019214835-A1, all pages (Year: 2019).*
          (Continued)

*Primary Examiner* — Naishadh N Desai
(74) *Attorney, Agent, or Firm* — Collard & Roe, P.C.

(57)          ABSTRACT

An electromechanical spindle drive includes a housing, a motor, a rotational part in the form of a spindle nut, the rotational part being rotated by the motor about a rotational axis, a spindle which interacts with the rotational part, the threaded section of which is arranged within the rotational part and which exits the rotational part at a spindle outlet end, and bearings by means of which the rotational part is rotatably mounted relative to the housing, wherein at least one, preferably at least two of the bearings, are arranged in the region of the spindle outlet end of the rotational part and/or are designed in the form of a radial bearing.

34 Claims, 12 Drawing Sheets

Figure 1:
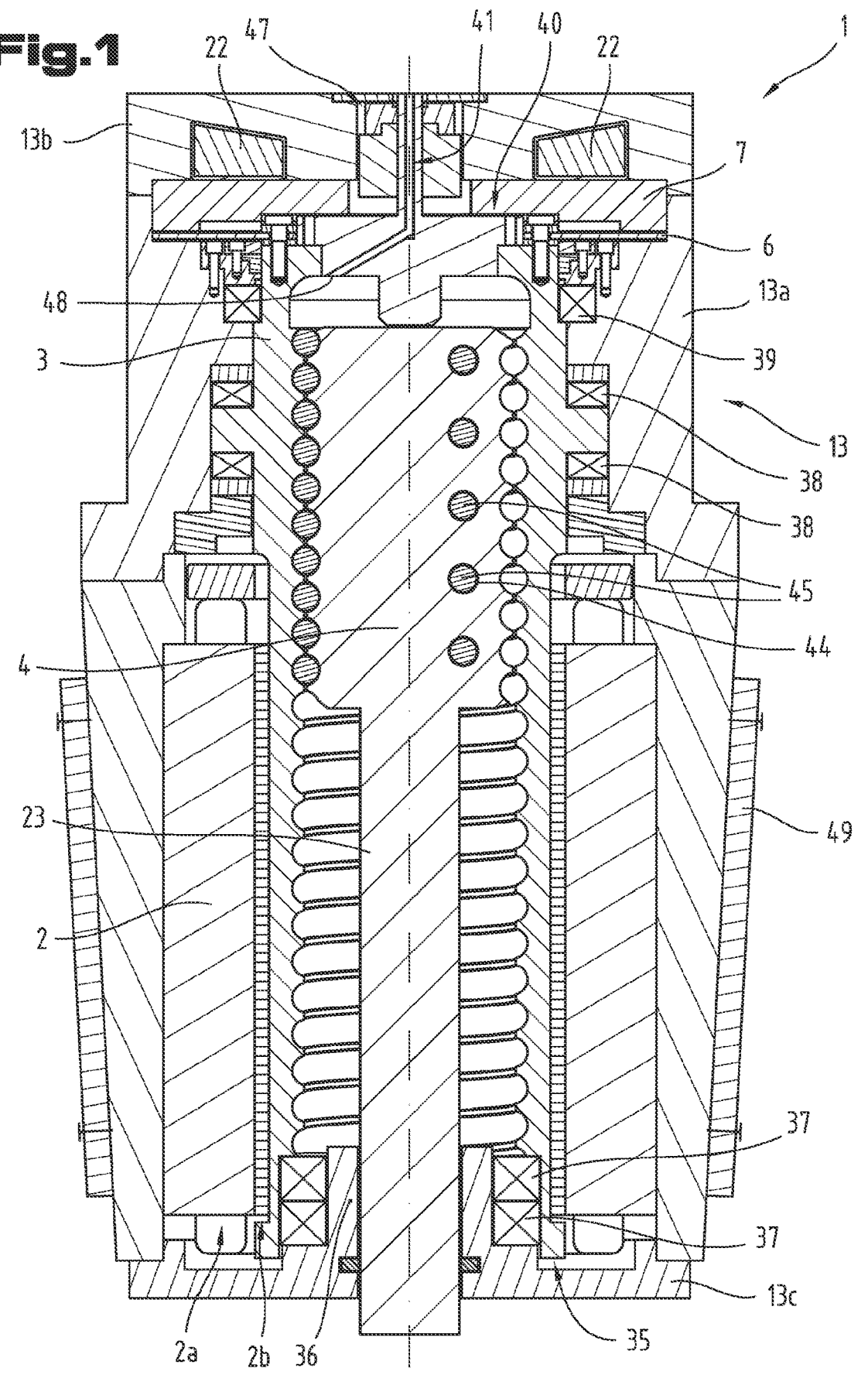

(51) Int. Cl.

| | |
|---|---|
| *H02K 1/2706* | (2022.01) |
| *H02K 5/173* | (2006.01) |
| *H02K 7/08* | (2006.01) |
| *H02K 7/102* | (2006.01) |
| *H02K 11/21* | (2016.01) |

(52) U.S. Cl.
CPC ........... *H02K 5/1737* (2013.01); *H02K 7/086* (2013.01); *H02K 7/102* (2013.01); *H02K 11/21* (2016.01)

(58) Field of Classification Search
CPC ... F16H 25/24; F16H 25/2454; H02K 1/2706; H02K 11/21; H02K 5/1737; H02K 7/003; H02K 7/086
See application file for complete search history.

(56) References Cited

U.S. PATENT DOCUMENTS

| | | | |
|---|---|---|---|
| 4,102,035 A | | 7/1978 | Voglrieder et al. |
| 8,371,661 B2 | | 2/2013 | Leiber et al. |
| 8,692,428 B2 | | 4/2014 | Miyairi et al. |
| 10,243,427 B2 | * | 3/2019 | Fukunaga .............. H02K 1/278 |
| 11,389,921 B2 | | 7/2022 | Klein et al. |
| 2005/0081660 A1 | | 4/2005 | Migliori |
| 2013/0285494 A1 | * | 10/2013 | Iversen ................... F16H 25/20 |
| | | | 310/83 |
| 2014/0300253 A1 | * | 10/2014 | Rapp ........................ H02K 7/06 |
| | | | 310/68 B |
| 2022/0144239 A1 | | 5/2022 | Greiner et al. |
| 2022/0311308 A1 | | 9/2022 | Kuhn et al. |
| 2023/0008294 A1 | | 1/2023 | Reisch et al. |

FOREIGN PATENT DOCUMENTS

| | | | | |
|---|---|---|---|---|
| DE | 27 58 962 A1 | | 10/1978 | |
| DE | 10 2004 054 836 A1 | | 5/2006 | |
| DE | 10 2005 018 649 A1 | | 10/2006 | |
| DE | 10 2012 010 010 A1 | | 11/2013 | |
| DE | 20 2015 107 053 U1 | | 2/2016 | |
| DE | 112014005384 T5 | * | 8/2016 | ............. H02K 1/278 |
| DE | 102015204073 A1 | * | 9/2016 | ............. F16H 57/12 |
| DE | 20 2017 000 022 U1 | | 1/2017 | |
| DE | 10 2018 127 660 A1 | | 5/2020 | |
| DE | 10 2019 205 974 A1 | | 10/2020 | |
| DE | 102020208956 A1 | * | 1/2022 | ............. F16C 19/163 |
| EP | 1 524 455 A2 | | 4/2005 | |
| EP | 2 319 636 A1 | | 5/2011 | |
| EP | 2 333 380 A1 | | 6/2011 | |
| EP | 2 891 824 A2 | | 7/2015 | |
| EP | 2349704 B1 | * | 3/2022 | ......... F16H 25/2204 |
| WO | WO-2010044114 A1 | * | 4/2010 | ............. F16H 25/20 |
| WO | WO-2019214835 A1 | * | 11/2019 | ............. B60T 11/236 |
| WO | 2021/121855 A1 | | 6/2021 | |

OTHER PUBLICATIONS

DE-102015204073-A1, all pages (Year: 2016).*
EP-2349704-B1, all pages (Year: 2022).*
WO-2010044114-A1, all pages (Year: 2010).*
DE-112014005384-T5, all pages (Year: 2016).*
DE-102020208956-A1, all pages (Year: 2022).*
International Search Report in PCT/AT2022/060049, mailed May 17, 2022.

* cited by examiner

Fig.10
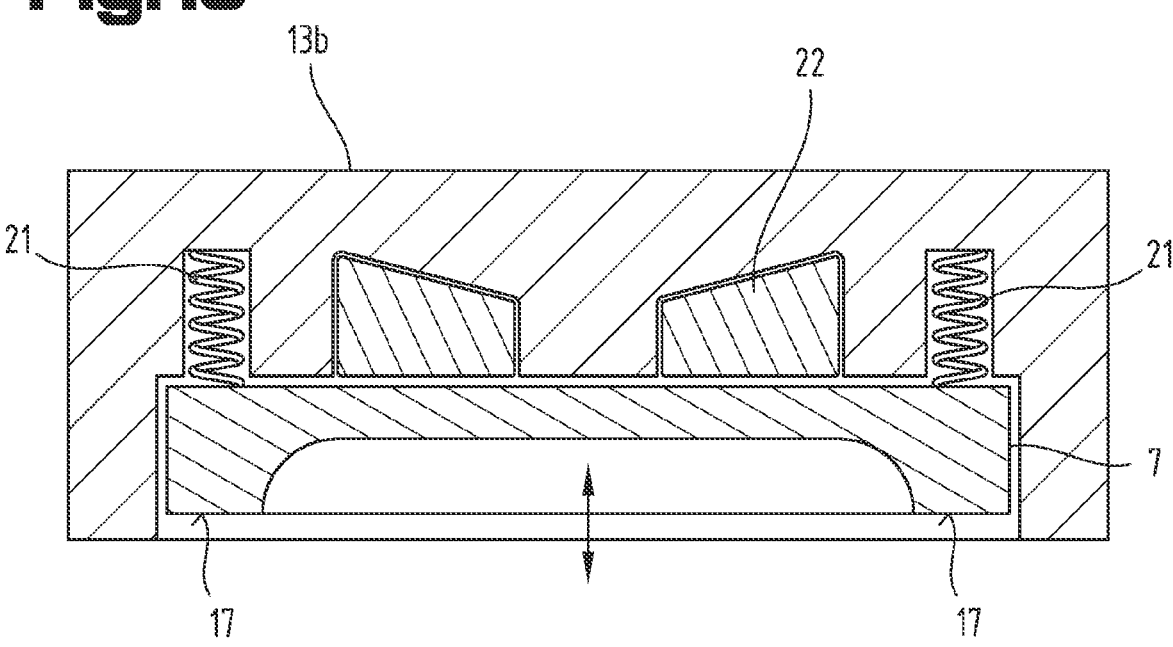
Fig.11
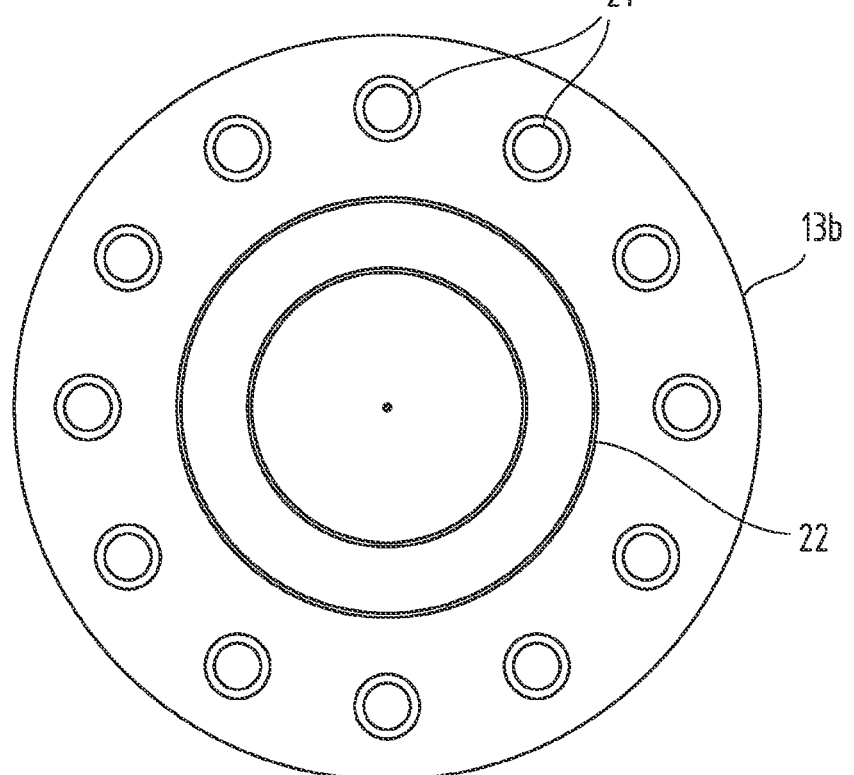

ELECTROMECHANICAL SPINDLE DRIVE

CROSS REFERENCE TO RELATED APPLICATIONS

This application is the National Stage of PCT/AT2022/060049 filed on Feb. 22, 2022, which claims priority under 35 U.S.C. § 119 of Austrian Application No. A50123/2021, filed on Feb. 23, 2021, the disclosure of which is incorporated by reference. The international application under PCT article 21(2) was not published in English.

The invention relates to an electromechanical spindle drive according to the preamble of claim 1. The invention also relates to a spindle drive component set, a forming machine and a method of forming a workpiece.

Various types of forming machines, especially bending machines, are known from the prior art. In most cases, a hydraulic press drive is used, the actuation of which triggers the working movement of one or more forming tools. Braking devices are intended to increase the safety of the machine and, in particular, to protect the personnel.

In a completely different field, EP1524455A2 discloses, in connection with an electrically actuated linear actuator in the form of a spindle drive, a motor which drives a drive shaft inside the drive housing via a gearbox. Furthermore, a braking device is provided which comprises an axially movable first clutch disc and a second clutch disc cooperating with the drive shaft via a hub. The first clutch disc presses the second clutch disc against a third clutch disc. By actuating a coil, the first clutch disc is moved into a releasing position so that the second clutch disc can rotate with the drive shaft.

EP2333380A1 also discloses, in connection with a linear actuator as a drive source, a motor and a braking device with a rotating brake disc and a stationary brake disc which is movable relative to the rotating brake disc and enables braking the drive shaft by friction.

The disadvantages resulting from the prior art consist in particular in the fact that the drives disclosed therein and their operation are not suitable for the application of forming workpieces, in particular for forming steps which must be carried out precisely and reproducibly. It should also be mentioned that the braking effect, especially the braking torque or braking force, is too low for certain applications. The braking process, i.e. the time that elapses between actuation of the braking device and the braking effect (e.g. standstill of the drive or braking to a desired level), is often too long.

A significant disadvantage of the spindle drives known from the state of the art is that the required installation space is very large. For applications where space is an issue, such spindle drives can therefore often not be used.

The object of the present invention was to overcome the disadvantages of the prior art and to provide a spindle drive in which a reliable and space-saving design is ensured, wherein in particular the transmission of force or movement via the rotational part to the spindle is to be ensured.

In one variant, a method for forming a workpiece is also to be provided, with which, on the one hand, an immediate and rapid onset of action of the forming tool on the workpiece can be achieved and, on the other hand, the efficiency and accuracy of the forming of the workpiece is increased. In addition, the respective action of the forming tool should be as defined as possible, in particular with regard to the amount of force exerted and/or the duration of the action of force. In addition, it should be possible to reduce the time required for forming a workpiece, in particular for those cases in which a forming step comprises several sub-steps. In preferred embodiments, the braking effect and the efficiency of the braking process or the application of the braking torque are also to be increased.

This object is solved by a spindle drive of the type mentioned above in that at least one, preferably at least two, of the bearings are arranged in the region of the spindle outlet end of the rotational part and/or are designed in the form of a radial bearing. These measures improve the support of the rotational part.

A preferred embodiment is characterised in that the at least one bearing arranged in the region of the spindle outlet end of the rotational part is arranged inside the rotational part, preferably on an inner side of the rotational part. Such a measure can significantly reduce the required installation space, in particular the dimensions perpendicular to the rotational axis. Here, the space that already exists within the rotational part is utilised for supporting.

A preferred embodiment is characterised in that the at least one bearing arranged in the region of the spindle outlet end of the rotational part is arranged between the inside of the rotational part and a bearing housing projecting into the interior of the rotational part, wherein preferably the bearing housing is formed on a housing part, preferably an end-face housing cover, of the housing. This ensures reliable mounting of the bearing, for which housing parts may preferably be used. This allows the installation space and also the weight to be further reduced.

A preferred embodiment is characterised in that the at least one bearing arranged in the region of the spindle outlet end of the rotational part is arranged axially overlapping with the stator and/or the rotor of the motor and/or is arranged within an area enclosed by the stator and/or rotor of the motor. This measure can also reduce the axial dimension of the spindle drive because the bearing does not connect axially to the motor but overlaps with it axially. In other words, bearing and motor (stator and/or rotor) are at least partially at the same axial height.

A preferred embodiment is characterised in that the at least one bearing arranged in the region of the spindle outlet end of the rotational part is a rolling bearing, in particular a ball bearing.

A preferred embodiment is characterised in that at least one of the bearings, preferably a radial bearing, is arranged in the area of the end of the rotational part opposite the spindle outlet end.

A preferred embodiment is characterised in that at least one of the bearings is an axial bearing, which is preferably arranged in the area between the motor and a braking device of the electromechanical spindle drive. This measure reduces the required installation space because the axial bearing is arranged in an area where space is available anyway.

A preferred embodiment is characterised in that the stator of the motor surrounds the rotational part and/or that the rotor of the motor comprises pole elements, preferably in the form of permanent magnets, mounted on the outside of the rotational part, preferably in a removable manner, and/or that the motor is a synchronous motor.

A preferred embodiment is characterised in that the spindle drive is a rolling spindle drive in which rolling elements, in particular in the form of balls, are guided in a circulating path, a first portion of the circulating path being formed between the internal thread of the rotational part and the external thread of the spindle and a second portion being formed by a return channel, the return channel being formed in the interior of the spindle. Placing the return channel in the spindle also saves space, as the walls of the rotational part (which would otherwise have to house the return channel) can be kept thinner.

A preferred embodiment is characterised in that at the end of the rotational part opposite the spindle outlet end, an attachment part is connected to the rotational part, preferably the attachment part having a portion located inside the rotational part and/or forming a stop for the spindle. The attachment part is non-rotatably (positively and/or non-positively), preferably rigidly, connected to the rotational part and therefore rotates with it. The attachment part can fulfil different functions as required: as a cover, as an interface for a lubricant supply to the inside of the rotational part, as a link to a sensor device, etc.

A preferred embodiment is characterised in that a portion of the attachment part located outside the rotational part is formed in the shape of a pin, wherein the longitudinal axis of the pin coincides with the rotational axis of the rotational part, wherein preferably the maximum diameter of the portion of the attachment part located inside the rotational part is at least 3 times, preferably at least 4 times, as large as the diameter of the pin. The pin may guide through other structures and/or components (such as sensor device, braking device, etc.), e.g. to a lubricant connection.

A preferred embodiment is characterised in that the spindle drive comprises a sensor device, wherein a portion of the attachment part located outside the rotation part is disposed in the detection range of the sensor device, wherein preferably the sensor device is a rotary encoder which detects the rotation of the attachment part.

A preferred embodiment is characterised in that a lubricant channel is formed in the attachment part for supplying lubricant to the inside of the rotational part.

A preferred embodiment is characterised in that the path of a first portion of the lubricant channel is aligned with the rotational axis of the rotational part, preferably the first portion of the lubricant channel running in a portion of the attachment part located outside the rotational part. The first portion may terminate in a lubricant inlet which is connected to a (lubricant) supply line or supply device.

A preferred embodiment is characterised in that the path of a second portion of the lubricant channel has a radial component with respect to the rotational axis and/or is oblique to the rotational axis, wherein preferably the second portion of the lubricant channel runs in a portion of the attachment part located inside the rotational part and/or ends (inside the rotational part) at an exit point which, with respect to the rotational axis, is arranged in a peripheral region of the attachment part. The lubricant serves to lubricate the internal thread of the rotational part and the external thread of the spindle as well as, if necessary, the rolling elements arranged between them.

A preferred embodiment is characterised in that the attachment part is surrounded by a braking device of the spindle drive, wherein preferably the attachment part is disposed within a central recess of a brake disc of the braking device and/or forms a preferably positive receptacle for a brake disc of the braking device. The attachment part may thus be used for centring and/or positioning the brake disc.

A preferred embodiment is characterised in that cooling fins are arranged on the outside of the housing, at least in the area of the motor, wherein the cooling fins are preferably removable from the housing body.

A preferred embodiment is characterised in that the spindle drive has a modular design.

A preferred embodiment is characterised in that the spindle drive has a braking device which can be actuated between a braking position and a released position, wherein the braking device acts on the rotational part, wherein preferably the braking device is arranged in the region of the end of the rotational part opposite the spindle outlet end.

A preferred embodiment is characterised in that the braking device has a brake disc that rotates with the rotational part and a braking element that can be adjusted in the axial direction and acts on the brake disc in the braking position.

A preferred embodiment is characterised in that the brake disc has an inner area, a friction surface area extending annularly around the rotational axis with a first friction surface formed on a first side of the brake disc, and an intermediate area extending between the friction surface area and the inner area around the rotational axis, and in that a first mating surface is formed on the braking element, which mating surface faces the first friction surface and interacts with the first friction surface in the braking position.

The braking element does not rotate with the rotational part. In other words, the braking element is stationary with respect to the rotation of the rotational part or the brake disc that is rotationally connected to the rotational part. The braking element exerts a braking effect in the braking position by frictional engagement with the brake disc. According to the embodiment of the invention, the friction surface area is located outside the inner area in the radial direction and also outside the intermediate area. While the inner area can serve as a attachment area (for attachment to the rotational part), the intermediate area is preferably designed to be deformable. It is preferred if the inner area and the intermediate area are not in contact with the braking element even in the braking position. The braking effect is highest in the peripheral area. On the one hand, the speed is greatest there, and on the other hand, the greatest braking torque can be applied there.

The braking element may be moved in the axial direction from the released position to the braking position. This movement reduces the brake gap until the braking element presses with its first mating surface against the first friction surface of the brake disc.

The braking torque is transmitted to the rotational part via the areas located radially further inwards (inner area and intermediate area).

The brake disc may be axially fixed with its inner area relative to the rotational part. In the braking position, the braking element presses against the friction surface area further out, exerting a deforming force on the brake disc. The latter wants to bend in the axial direction.

The rotational part may be, for example, a drive shaft, a threaded nut (e.g. in a spindle drive), a rotor (of an electric motor) or any rotating element of a drive train.

A preferred embodiment is characterised in that the intermediate region of the brake disc, both in the released position and in the braking position, is free of contact with the braking element and/or that in the braking position the contact of the braking element with the brake disc is limited to the first friction surface. This measure ensures that the frictional connection only occurs in the area of the friction surface area, while the inner area and the intermediate area do not come into direct contact with the braking element. In particular, the intermediate area can thus take on an additional functionality.

A preferred embodiment is characterised in that the intermediate area is a deformation area that is elastically deformable in the axial direction by the action of the braking element on the brake disc. In contrast to known solutions, the brake disc may be axially fixed to the rotational part. A rigid connection between the brake disc and the rotational part may be provided. This increases the braking effect; in particular the braking force is transmitted directly to the rotational part.

A preferred embodiment is characterised in that cut-outs, preferably in the form of perforations, and/or material weakenings are formed in the deformation area. The degree of deformability can be determined by the number of cut-outs and optimised for different areas of application. Alternatively, the deformation area may also be characterised by a lower material thickness compared to the inner area and/or friction surface area.

A preferred embodiment is characterised in that in the deformation area the total area of the cut-outs is at least as large as the total area occupied by the remaining material. This ensures sufficient deformation, especially if the friction surface area is pressed against a second mating surface in the braking position.

A preferred embodiment is characterised in that the friction surface area comprises a second friction surface formed on the second side of the brake disc opposite to the first side, and in that the friction surface area of the brake disc is arranged between the first mating surface and a second mating surface facing the second friction surface and cooperating with the second friction surface in the braking position. In the released position of the braking device, a brake gap is formed between the respective interacting surfaces. By means of a deformable intermediate area, it can be elegantly ensured, and as an alternative to an axial displaceability of the brake disc relative to the rotational part, that the brake gap(s) are closed over the entire surface by a deformation of the brake disc in the axial direction.

A preferred embodiment is characterised in that the first mating surface is annular and/or that the second mating surface is annular.

A preferred embodiment is characterised in that the friction surface area is arranged in the periphery of the brake disc, preferably the first friction surface and/or the second friction surface extending to the outer edge of the brake disc. As already mentioned, the braking effect is greatest in the outermost area of the brake disc.

A preferred embodiment is characterised in that the difference between the outer radius and the inner radius of the friction surface area is at most ⅓, preferably at most ¼, of the outer radius of the brake disc.

A preferred embodiment is characterised in that the electromechanical drive has a housing and that the second mating surface is formed on a housing part or on an element firmly connected to the housing part. This measure allows the braking torque to be introduced directly into the (stationary) housing. The braking energy given off in the form of heat can also pass into the housing, which means that there is no need for a complex brake cooling, as the heat can be conducted directly to the outside via the housing.

A preferred embodiment is characterised in that the inner region of the brake disc has at least one, preferably several, preferably annularly arranged, attachment interfaces, preferably in the form of holes, for attaching the brake disc to the rotational part, the number of attaching interfaces preferably being greater than 10 and/or greater than the number of cut-outs in the deformation area. A rigid connection between the brake disc and the rotational part is particularly preferred here, which can be ensured by screws, for example.

A preferred embodiment is characterised in that in the released position of the braking device, the first friction surface and the first mating surface deviate from a parallel alignment and/or in that in the released position of the braking device, the second friction surface and the second mating surface deviate from a parallel alignment. With this measure, for example, the pressure can be reduced at a portion of the friction surface area disposed more to the inner side, while it can be increased in a portion relative to it disposed more to the outer side. This allows for a more even distribution of pressure if the friction or mating surface(s) (or brake gap) are appropriately dimensioned. This reduces wear and increases service life. These advantages can also be achieved, for example, by the following preferred embodiments.

A preferred embodiment is characterised in that the distance between the first friction surface and the first mating surface decreases in the radial direction, this distance preferably being smaller at the radially outer edge of the first friction surface by at most 1 mm, preferably by at most 0.2 mm, than at the radially inner edge of the first friction surface, and/or in that the distance between the second friction surface and the second mating surface decreases in the radial direction, this distance preferably being smaller at the radially outer edge of the second friction surface by at most 1 mm, preferably by at most 0.2 mm, than at the radially inner edge of the second friction surface.

In the braking position, the pressure is reduced at a portion of the friction surface area disposed more to the inner side, while it is increased in a portion relative to it disposed more to the outer side. In addition, an adaptation to a brake disc which bends in the axial direction during the braking process can be made to a certain extent.

A preferred embodiment is characterised in that, in the released position of the braking device, the first friction surface and the first mating surface are inclined towards each other and/or that in the released position of the braking device the second friction surface and the second mating surface are inclined towards each other.

A preferred embodiment is characterised in that the first friction surface and/or the first mating surface have a curved shape in the radial direction and/or that the second friction surface and/or the second mating surface have a curved shape in the radial direction.

A preferred embodiment is characterised in that the inner area of the brake disc is axially fixed to the rotational part and/or that the inner area of the brake disc is rigidly connected to the rotational part, preferably by screws.

A preferred embodiment is characterised in that a first spacer ring is arranged between the inner region of the brake disc and the rotational part, wherein preferably the inner region of the brake disc is constrained between the first spacer ring and a second spacer ring, preferably by screws. The spacer ring(s) can be used to adjust or optimise the relative position of the friction surface(s) relative to the mating surface(s). They also ensure an even distribution of pressure.

A preferred embodiment is characterised in that the electromechanical drive is a spindle drive, wherein the rotational part to which the brake disc is connected is configured as a threaded nut which cooperates with the spindle of the spindle drive.

A preferred embodiment is characterised in that the brake disc has a disc-shaped base body and that the first friction surface and/or the second friction surface are formed by a preferably annular brake lining which is applied to the base body and/or projects in the axial direction beyond the base body.

A preferred embodiment is characterised in that the braking element is biased towards the braking position. The braking position can therefore be held here by passive (spring) elements independently of actuation or energisation.

A preferred embodiment is characterised in that the braking element is biased in the direction of the braking position by a plurality of springs which are arranged annularly and preferably overlapping with the first mating surface.

A preferred embodiment is characterised in that the springs are inserted in a removable housing part of the electromechanical drive.

A preferred embodiment is characterised in that the braking device comprises an actuator, which can be controlled by the control device, preferably in the form of an electromagnet, by means of which the braking element can be brought into the released position and/or into the braking position, the actuator preferably being inserted in a removable housing part of the electromechanical drive. Such a variant has the advantage that in the event of a power failure or a control fault, the electromagnets are de-energised and the braking device automatically assumes the braking position.

A preferred embodiment is characterised in that the braking device is integrated in the electro-mechanical drive and/or that the motor and the braking device are disposed in a common housing. This increases the immediate character of the braking effect, as braking takes place in the immediate area of engine torque generation.

The invention also relates to a spindle drive component set comprising components for a plurality of electromechanical spindle drives according to the invention, the component set having components of different types and the components having connection interfaces for connecting the components to one another, wherein components of the same type have different sizes, the connection interfaces of differently sized components of the same type being of the same dimensions. This measure makes it easy to adapt a spindle drive to the given requirements. Size, power, force, (spindle) stroke, weight and cooling capacity may be used as criteria for selecting the desired components and assembling them into a spindle drive according to the invention. The connection interfaces may be mechanical interfaces (attachment points or mechanisms) for housing parts, rotational part, spindle, motor parts (e.g. variable number of pole elements on the rotational part), etc., electrical and control-related interfaces, e.g. for motor, braking device and/or sensor device, hydraulic interfaces or fluid supply interfaces (lubricant).

A preferred embodiment is characterised in that the component set has first housing parts of different length and/or width, and second housing parts of different length and/or width,
wherein the connection interfaces of the first housing parts for connection to the second housing parts have the same dimensions for all first housing parts and for all second housing parts. This allows housing parts to be connected to other housing parts regardless of their size.

A preferred embodiment is characterised in that the component set has rotational parts of different length and/or width, and
housing parts of different length and/or width and/or motors of different length and/or width,
wherein the connection interfaces of the rotational parts for connection to the housing parts and/or motors have the same dimensions for all rotational parts,
and/or wherein the connection interfaces of the housing parts and/or motors for connection to the rotational parts have the same dimensions for all housing parts and/or motors.

The invention also relates to a forming machine, in particular a bending machine, for forming a preferably plate-type workpiece, wherein the forming machine comprises
at least one electromechanical spindle drive according to the invention,
at least one forming tool, the working movement of which is effected by the electro-mechanical drive.

The invention also relates to a method for forming a preferably plate-type workpiece with a forming machine, in particular a bending machine, according to the invention, wherein the motor of the electromechanical spindle drive for forming the workpiece is controlled by a control device.

In a preferred method for forming a preferably plate-type workpiece with a forming machine, in particular a bending machine, the forming machine comprises at least one electromechanical drive (spindle drive) with an electrical drive source (motor),
at least one forming tool, the working movement of which is effected by the electro-mechanical drive, and
at least one braking device that can be actuated between a released position and a braking position, preferably in the form of a friction brake, for braking and/or blocking the working movement of the forming tool.

One such embodiment is characterised in that before a movement phase of the forming tool, the electrical drive source generates a drive torque while the braking device is in the braking position, so that the braking torque of the braking device counteracts the drive torque of the electrical drive source, and the start of the movement phase of the forming tool is triggered by transferring the braking device into the released position and/or into a position with reduced braking torque, and/or
that during a forming step the working movement of the forming tool is intermittent.

The workpiece to be formed is preferably a plate-type workpiece made of metal, in particular a sheet. The forming machine is thus preferably a sheet forming machine, in particular a bending machine, such as a bending press or a folding machine.

The process is controlled by a control device. The control device controls the electric drive source on the one hand and the braking device on the other hand, so that the movement phase(s), in particular their start and/or their sequence, can be controlled with the control device. The control device thus actuates, according to the procedure, the electric drive source and the braking device and thus controls the drive torque (of the drive source) and the braking torque (of the braking device). The drive source and the braking device act directly or indirectly on the forming tool.

For example, an operating mode may be stored in the control device (e.g. in addition to other operating modes) which corresponds to the method.

By the measure of this embodiment, the working movement of the forming tool can be divided into individual movement phases, wherein the forming tool is stopped or slowed down between the individual movement phases. The division into the individual movement phases is carried out by the braking device. I.e. the working movement can be controlled by the braking device.

This embodiment has two major advantages. According to the first variant, the braking device is used to trigger the start of a movement phase. In this way, the braking device takes on a control function that does not (only) refer to braking or stopping a working movement, but to triggering or releasing a movement. Such a type of control may be used not only for a single movement phase, but also in particular for inter-mittent (e g hammering) working movements with several interrupted movement phases. Here, the braking device has the function of controlling the sequence of the movement phases.

The great advantage of this idea is that at the beginning of the movement phase (and thus at the beginning of the phase for machining the workpiece) the drive torque of the drive source does not have to be built up first, but is already available. A quick transfer of the braking device into the released position causes an immediate effect of the already existing drive torque on the forming tool and thus on the workpiece. This results in a defined work step, which is also initiated by a pulse or impact that is defined in terms of time and the acting force and is always precisely reproducible.

Another advantage is that a sequence of movement phases in intermittent actuation is made possible in the first place by the interaction of an electric drive source with an actuatable braking device. Here, too, the process is controlled by the control device. The control device controls the electrical drive source on the one hand and the braking device on the other, so that the movement phase(s) of the intermittent movement, in particular their start and/or their sequence, can be controlled with the control device.

The braking device comprises an actuator which is con-nected to the control device of the forming machine. The control device thus transfers the braking device between released and braking position by controlling the actuator.

The braking device is preferably a friction brake. This makes it possible to achieve a particularly fast transition between braking position and released position. This means that the movement phases and the phases between the movement phases may each preferably be less than 1.5 seconds, preferably less than 1 second.

A preferred embodiment is characterised in that the direc-tion of movement of the forming tool remains unchanged during the individual movement phases of an intermittent working movement and/or that the path made by the forming tool during an intermittent working movement is composed of the path portions made during the individual movement phases of the intermittent working movement. This is a progressive movement of the forming tool. E.g. a bending step may be achieved here by individual partial steps. In this process, the (repetitive) intermittent movements of the form-ing tool can generate the necessary forming force.

A preferred embodiment is characterised in that the work-ing movement of the forming tool during a forming step comprises several, preferably at least three, movement phases, wherein the movement phases are interrupted by phases in which the forming tool stands still or is moved at a lower speed than in the movement phase, wherein pref-erably the length of each individual movement phase is less than 3 seconds, preferably less than 1.5 seconds, and/or wherein preferably the length of each phase in which the forming tool is stationary or is moved at a lower speed than in the movement phase is less than 3 seconds, preferably less than 1.5 seconds.

A preferred embodiment is characterised in that an inter-mittent working movement of the forming tool is effected by an intermittent actuation of the braking device between the released position and the braking position. Here the braking device takes over a control function, ensuring a precise and well-defined machining of the workpiece.

A preferred embodiment is characterised in that the elec-tric drive source also generates a drive torque during those phases of the intermittent actuation of the braking device in which the braking device is in the braking position. Here, the drive source does not always have to build up a drive torque anew, which would be associated with a recurring latency at the beginning of each movement phase.

A preferred embodiment is characterised in that the drive torque of the motor is kept substantially constant during a forming step with intermittent working movement of the forming tool. This minimises the control effort for the drive source, while control is made via the braking device.

A preferred embodiment is characterised in that the elec-tromechanical drive comprises a rotational part and the braking device acts on the rotational part, wherein preferably the electrical drive source is formed by a motor whose drive torque acts on the rotational part. Simple and efficient braking devices such as friction brakes and powerful drives such as motors may be used here.

A preferred embodiment is characterised in that the brak-ing torque acting on the rotational part, during those phases of intermittent actuation of the braking device in which the braking device is in the braking position, is higher than the driving torque acting on the rotational part. This measure can bring the movement of the forming tool to a standstill between the single movement phases.

A preferred embodiment is characterised in that the elec-tromechanical drive comprises a transmission mechanism, in particular a linear drive, which converts the rotation of the rotational part into a linear movement of a transmission element which acts directly or indirectly on the forming tool, preferably the transmission element being configured as a spindle.

A preferred embodiment is characterised in that the brak-ing device is integrated in the electro-mechanical drive and/or that the electrical drive source and the braking device are disposed in the same housing.

The invention also relates to a forming machine, in particular a bending machine, for forming a preferably plate-type workpiece, wherein the forming machine com-prises at least one electromechanical drive with an electrical drive source, at least one forming tool whose working movement is effected by the electro-mechanical drive, at least one braking device which can be actuated between a released position and a braking position for braking and/or blocking the working movement of the forming tool, and a control device for controlling the electric drive source and the braking device, characterised in that an oper-ating mode is stored in the control device by means of which the electric drive source and the braking device can be controlled in such a way that before a movement phase of the forming tool, the electrical drive source generates a drive torque while the braking device is in the braking position, so that the braking torque of the braking device counteracts the drive torque of the electrical drive source, and the start of the movement phase of the forming tool is triggered by transferring the braking device into the released position and/or into a position with reduced braking torque, and/or that during a forming step the working movement of the forming tool is intermittent.

The forming machine is preferably a bending machine and may be configured, for example, as a bending press, in particular a press brake, or as a folding machine.

Such a forming machine may comprise a first (e.g. upper) tool carrier and a second (e.g. lower) tool carrier whose relative movement is the working movement. For example, one tool carrier may be stationary while the other tool carrier may be moved by the electric drive.

Here, the at least one electric drive of the forming machine acts on a tool carrier, preferably the upper tool carrier. The forming tool is held by a tool carrier.

A preferred embodiment is characterised in that the electromechanical drive comprises a rotational part and the braking device acts on the rotational part, wherein preferably the electrical drive source is formed by a motor whose drive torque acts on the rotational part.

In following embodiments, the braking effect and the efficiency of the braking process or the application of the braking torque are also to be increased. This is particularly intended to increase safety in applications where operators work or handle in the danger zone and drives must therefore come to an immediate standstill under certain conditions. The reliability, performance and usability of an electromechanical drive in a wide range of applications is to be increased by improving the braking device.

A preferred embodiment of the forming device is characterised in that the control device with the stored operating mode is configured to operate the forming machine according to a method, in particular according to one of the embodiments described above, by controlling the electrical drive source and the braking device.

A preferred embodiment of the method is characterised in that the forming machine is configured according to the invention, in particular according to one of the embodiments described above.

The object is also achieved with a forming machine, in particular a bending machine, preferably a bending press, with at least one drive for the working movement, in particular a press drive, wherein the at least one drive is an electromechanical drive. Such a forming machine may comprise a first (e.g. upper) tool carrier and a second (e.g. lower) tool carrier whose relative movement is the working movement. The electromechanical drive described above is particularly well suited for use in a forming machine, as the proposed braking device reacts in a particularly prompt way, thus reliably protecting the operating personnel in particular (especially in cases where a shutdown or a stop/slowdown of the working movement is relevant for safety) but also "protecting" workpieces from incorrect or faulty machining routines.

For the purpose of better understanding of the invention, this will be elucidated in more detail by means of the figures below.

Figure 2:
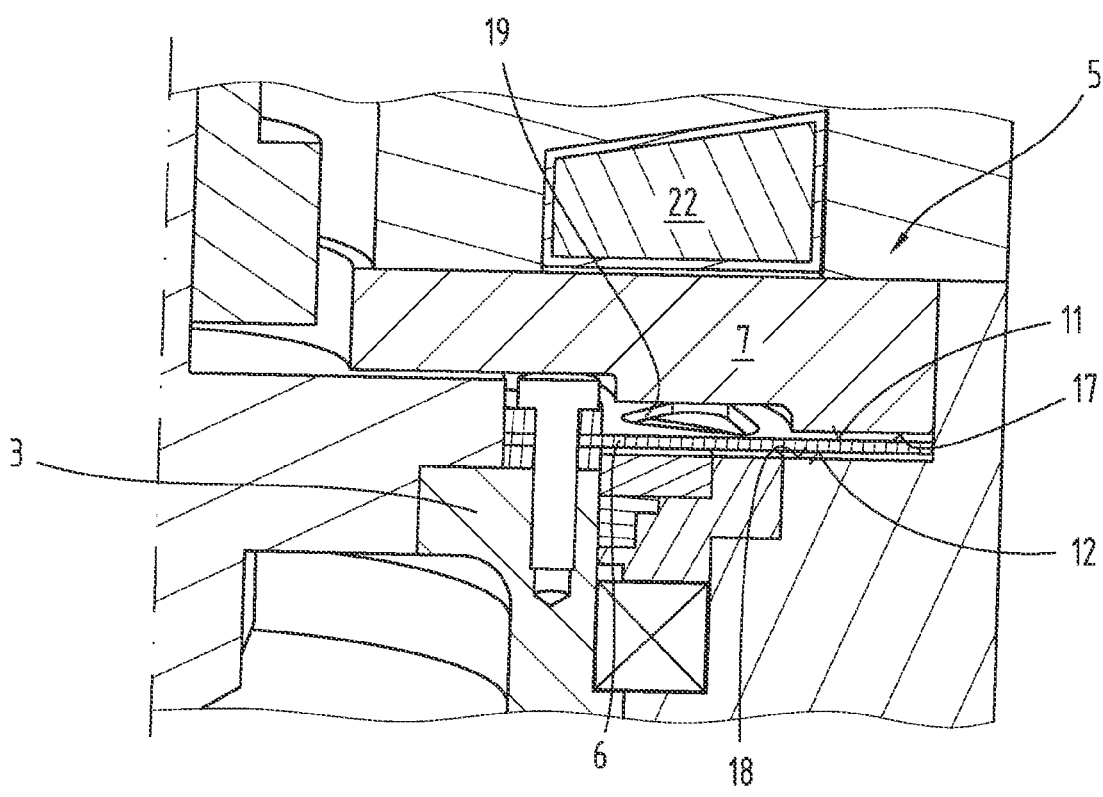
Figure 3:
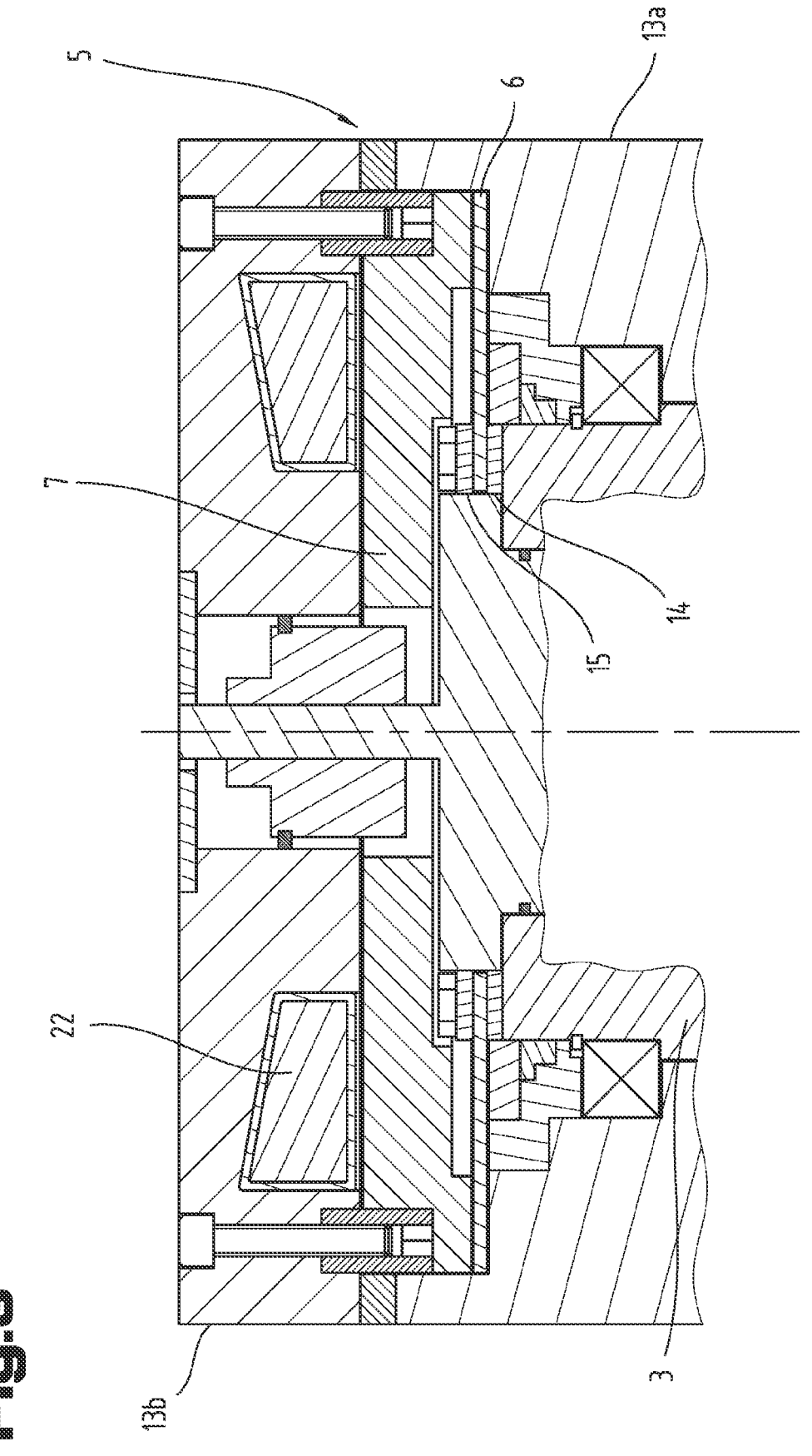
Figure 4:
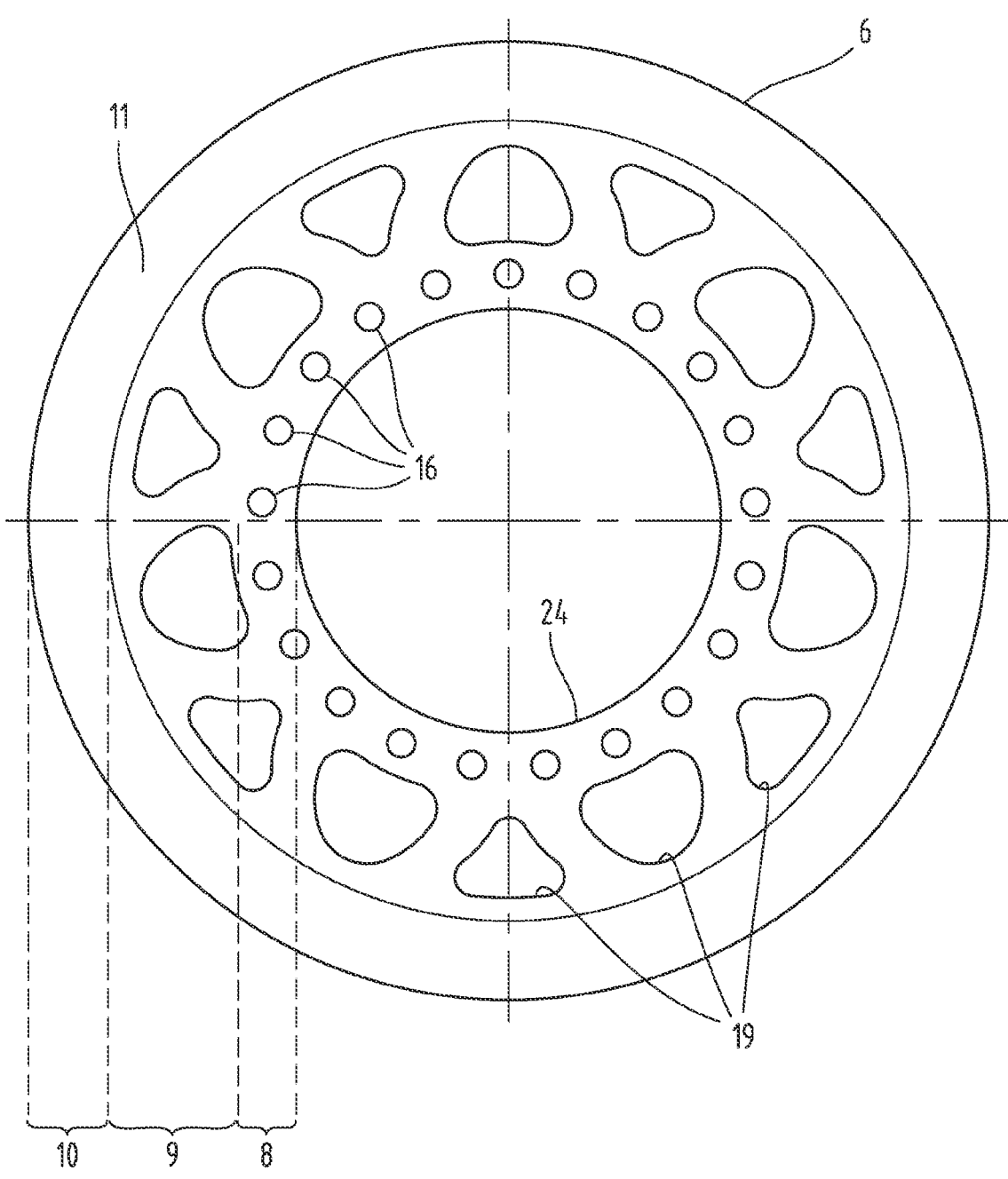
Figure 5:
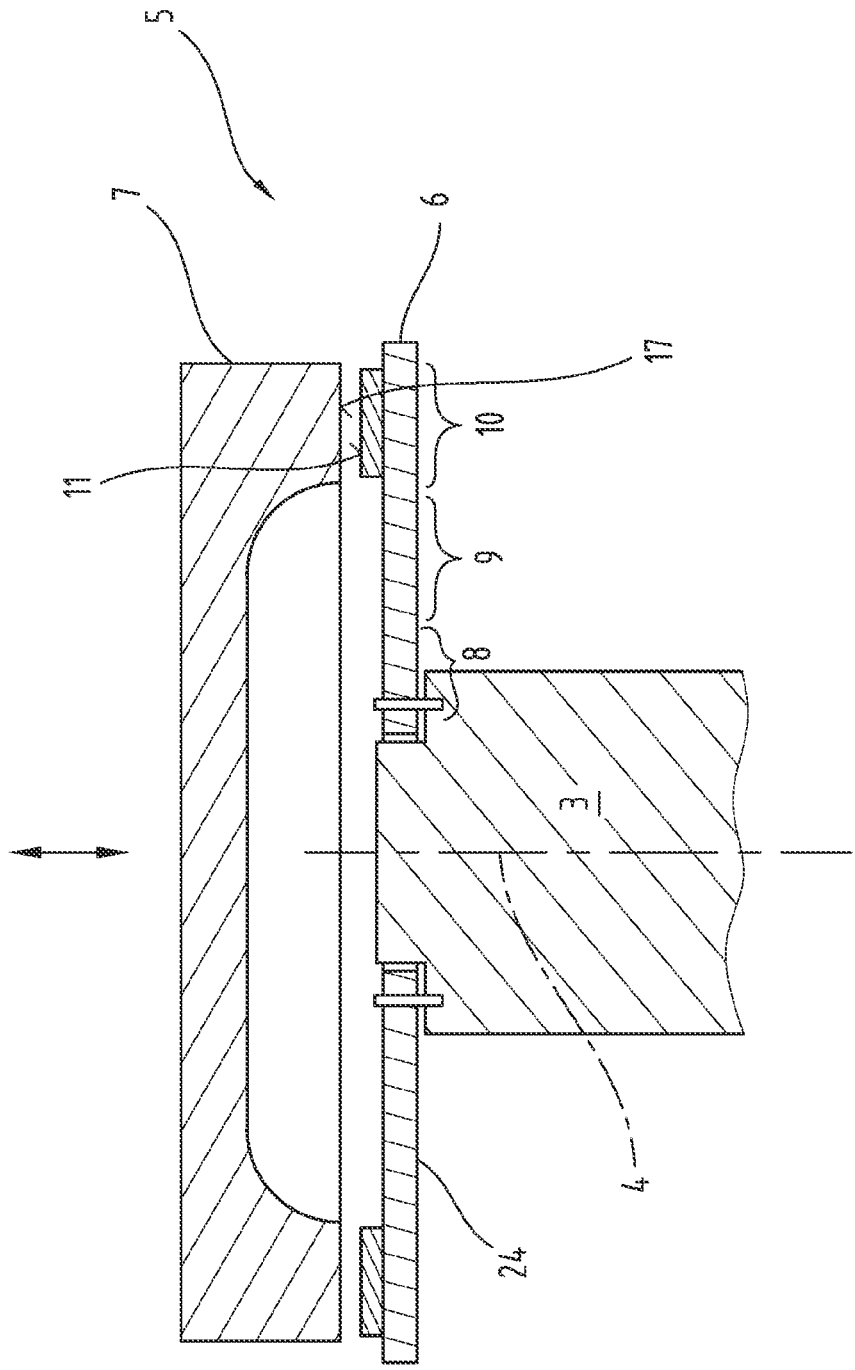
Figure 5:
Figure 6:
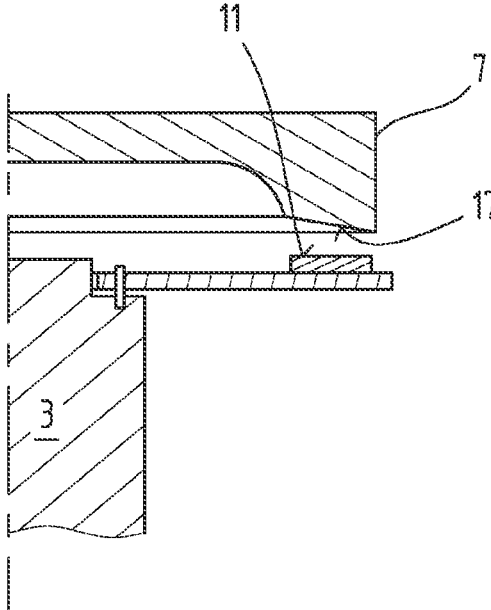
Figure 7:
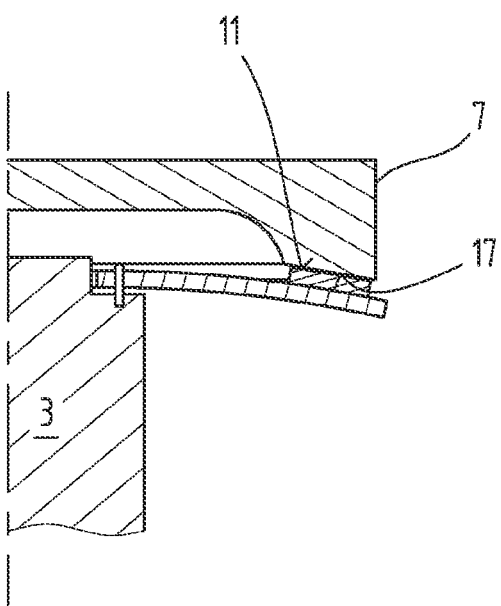
Figure 8:
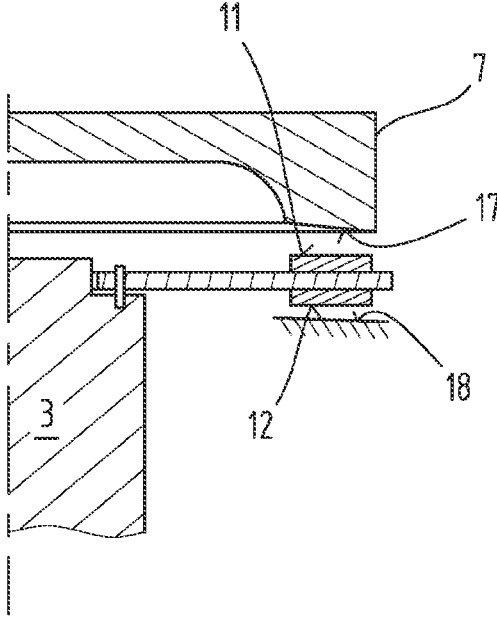
Figure 9:
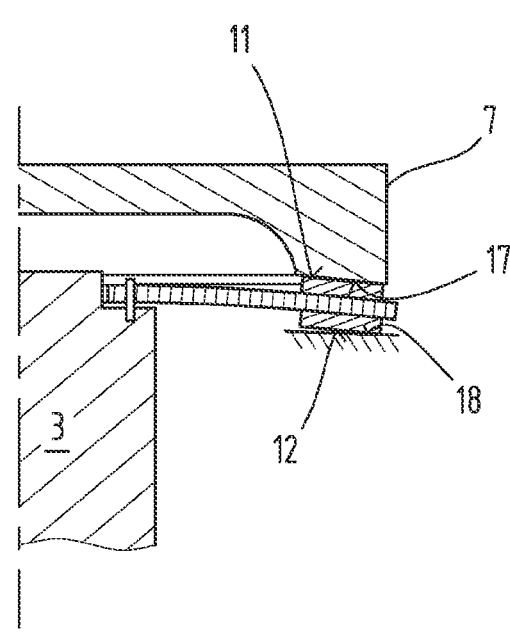
Figure 12:
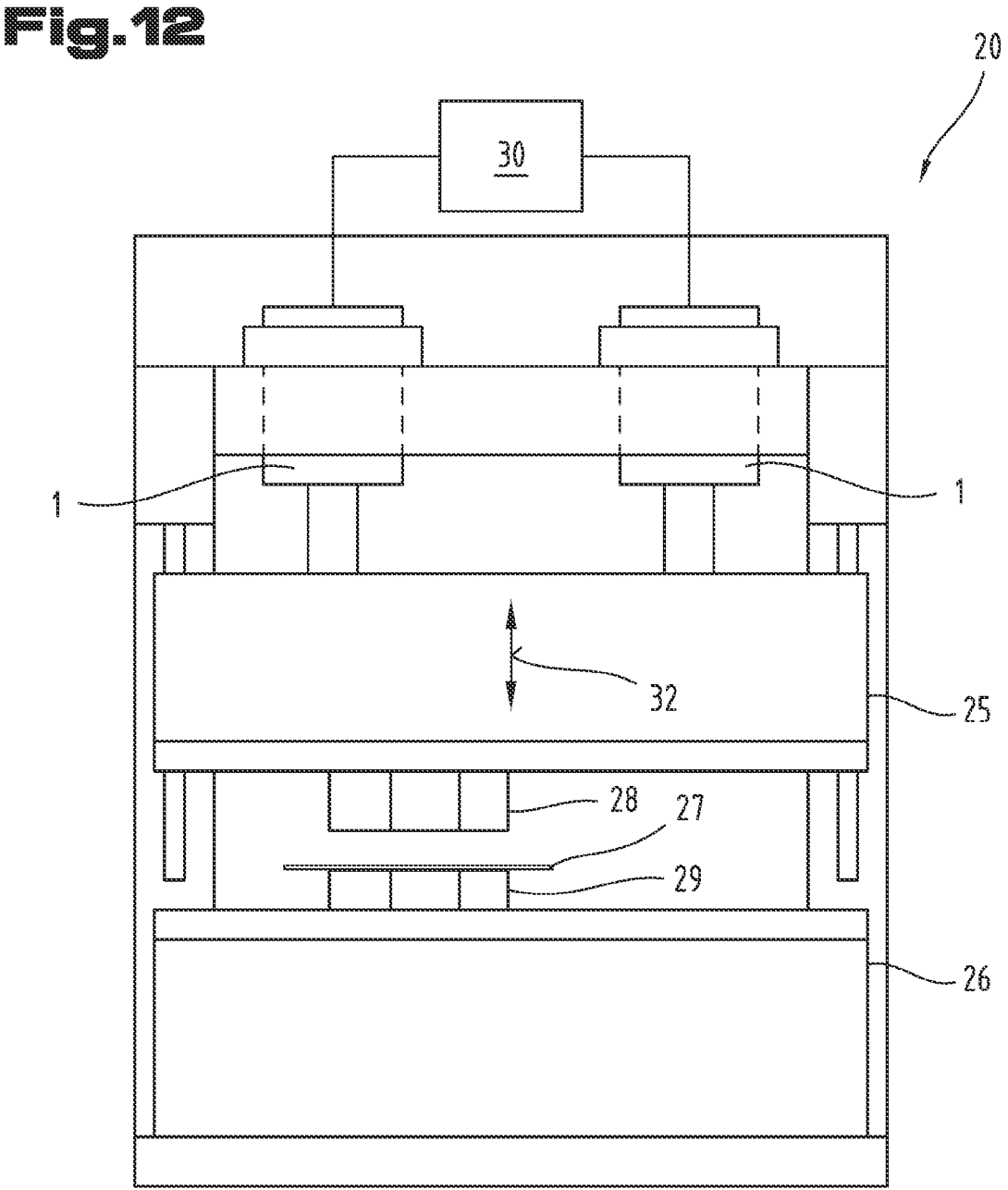
Figure 13:
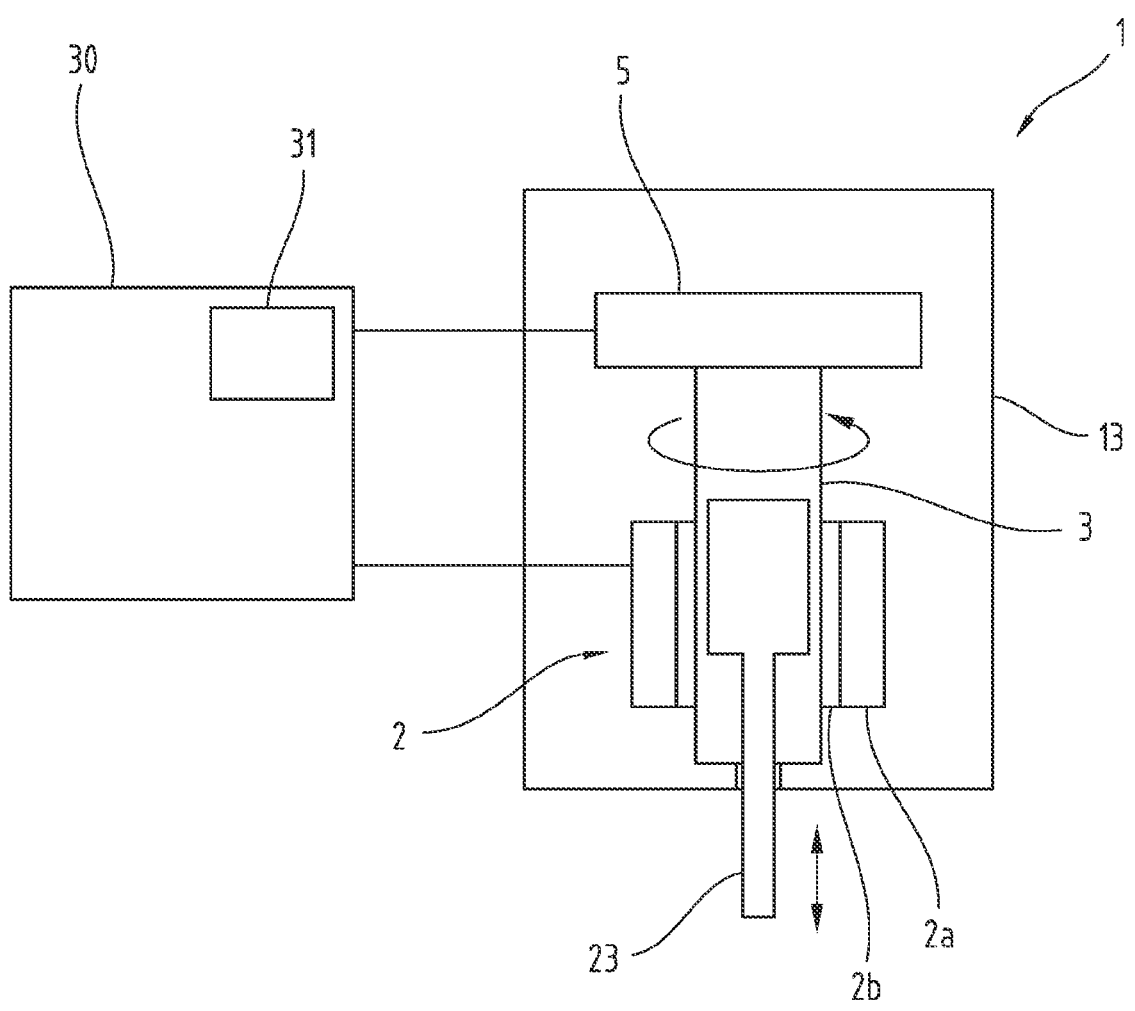
Figure 14:
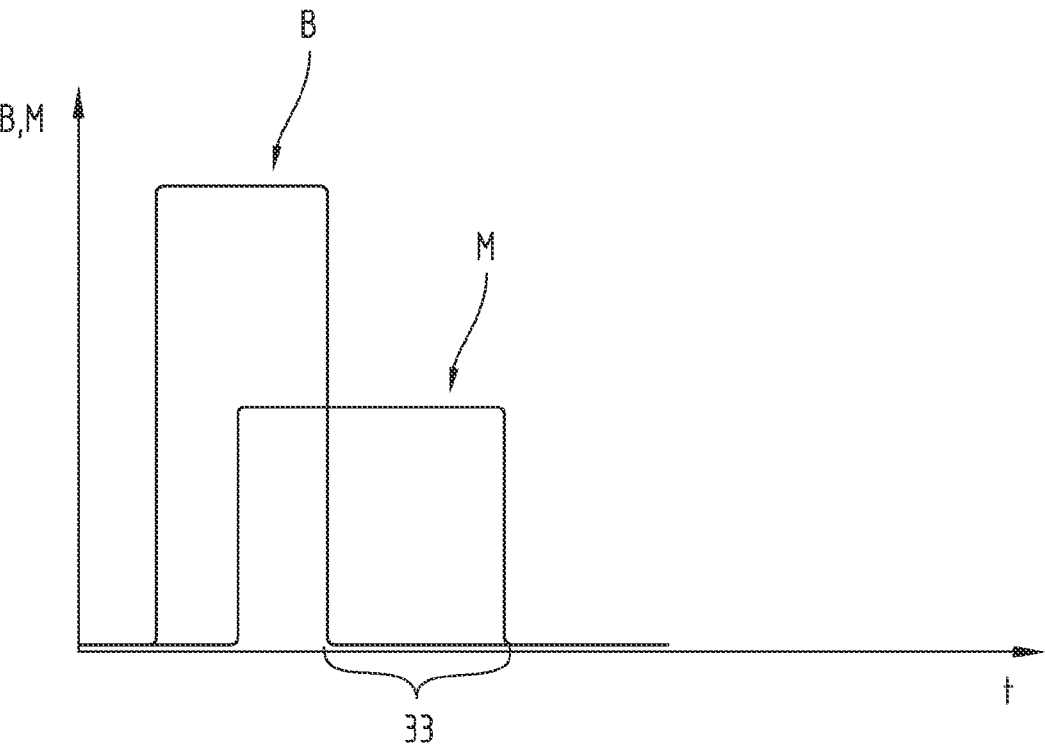
Figure 15:
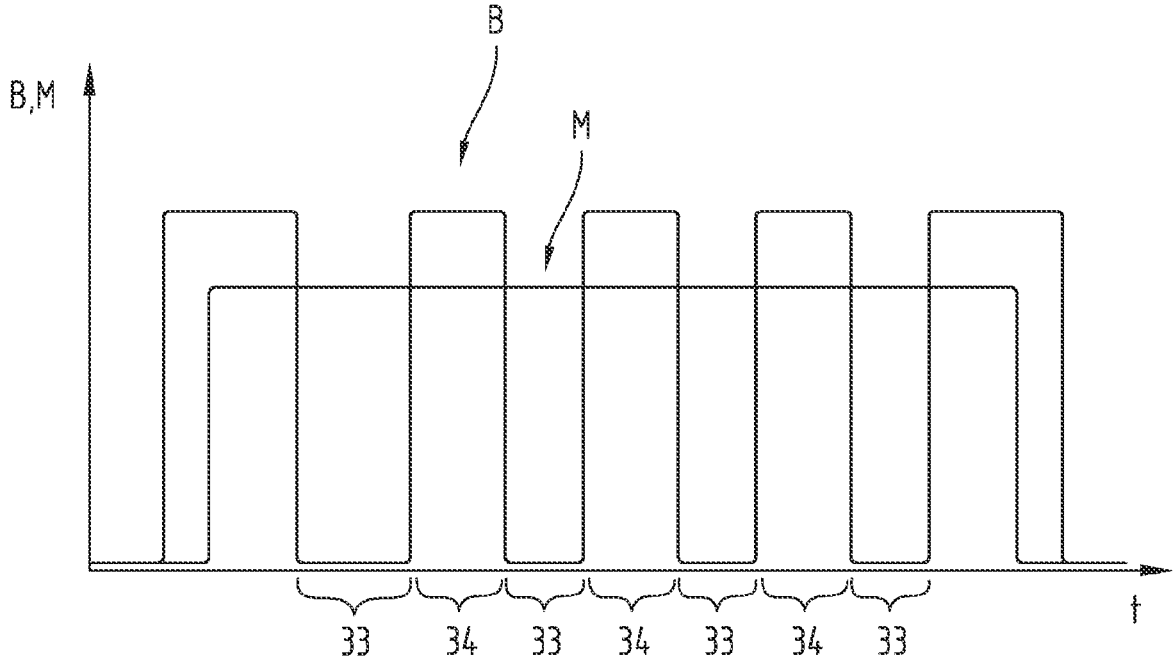
Figure 16:
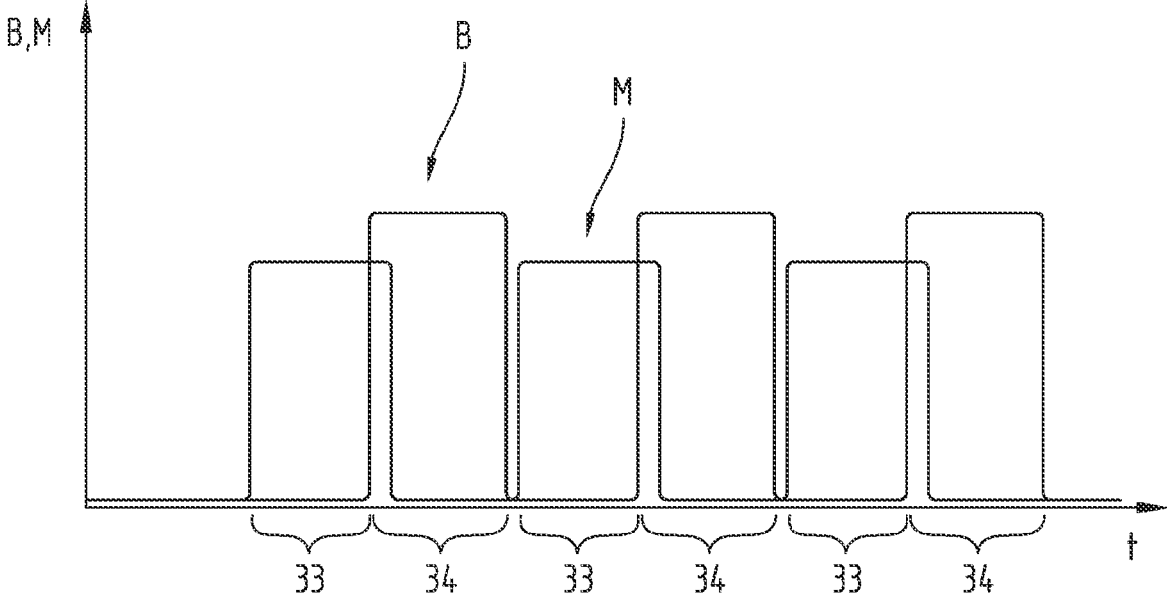
Figure 17:
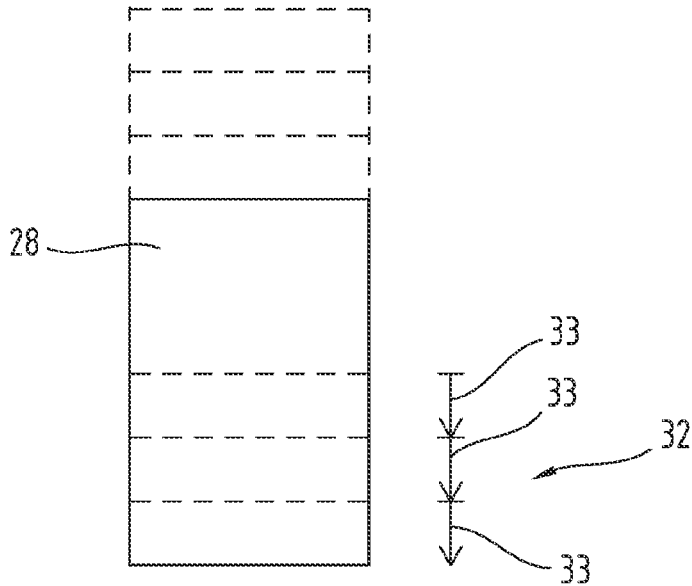
Figure 18:
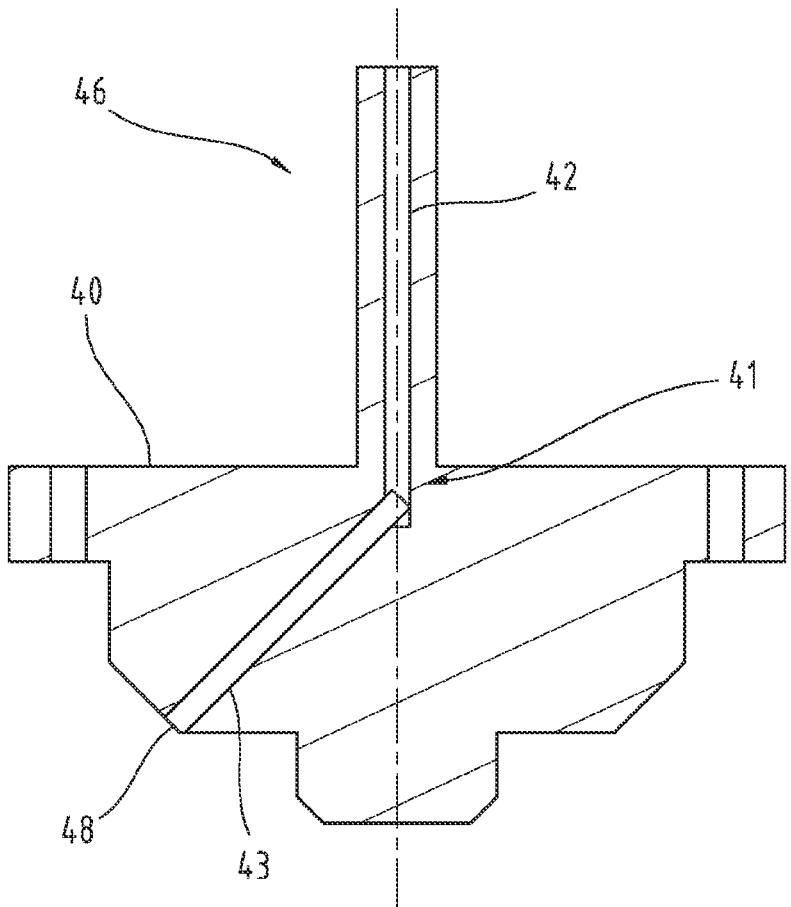

These show respectively in a very simplified schematic representation:

FIG. 1 an electromechanical drive in a cut view;

FIG. 2 a portion of a braking device with a perspective view;

FIG. 3 a braking device in a cut view;

FIG. 4 a brake disc;

FIG. 5 the interaction of the braking element and the brake disc;

FIG. 6 a braking device in the released position;

FIG. 7 a braking device in the released position;

FIG. 8 a braking device with a second braking and mating surface in released position;

FIG. 9 a braking device with a second braking and mating surface in released position;

FIG. 10 a braking device with a preloaded braking element;

FIG. 11 a housing part with receptacles for springs and a receptacle for an actuator;

FIG. 12 a forming machine in the form of a bending press with electromechanical drives;

FIG. 13 a control device with an electromechanical drive;

FIG. 14 in a first embodiment, the time characteristic of the drive torque of the drive source and the braking torque of the braking device;

FIG. 15 in a second embodiment, the time characteristic of the (essentially constant) drive torque of the drive source and the (intermittent) braking torque of the braking device during intermittent working movement;

FIG. 16 in a third embodiment, the time characteristic of the (intermittent) drive torque and the (intermittent) braking torque during intermittent working movement;

FIG. 17 the path made by a forming tool during a forming step;

FIG. 18 an attachment part for the rotational part.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the technical teaching provided by the present invention lies within the ability of the person skilled in the art in this technical field.

The scope of protection is determined by the claims. Nevertheless, the description and drawings are to be used for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

FIG. 1 shows an electromechanical spindle drive 1 comprising a housing 13, a motor 2 and a rotational part 3 which can be set in rotation about a rotation axis 4 by the motor 2.

The rotational part 3 is configured as a spindle nut. A spindle 23 interacts with the rotational part 3.

The threaded portion (external thread) of the spindle 23 is arranged inside the rotational part 3 and interacts there, preferably via rolling elements 45, with the internal thread of the rotational part 3, which is configured as a spindle nut. The spindle 23 exits the rotational part 3 at a spindle outlet end 35.

The motor 2 has a stator 2*a*, which is mounted e.g. on the inside of the housing 13 (e.g. in the form of windings), and a rotor 2*b*, which is e.g. connected to the rotational part 3 and/or arranged directly on the rotational part 3 (e.g. in the form of permanent magnets). It is preferred that the stator 2*a* of the motor 2 surrounds the rotational part 3. The rotor 2*b* of the motor 2 may comprise pole elements, preferably in the form of permanent magnets, mounted, preferably removably, on the outside of the rotational part 3. Preferably, the motor 2 is a synchronous motor.

The spindle drive 1 also has bearings 37, 38 and 39 by means of which the rotational part 3 is rotatably mounted relative to the housing 13.

As can be seen from FIG. 1, at least one, preferably at least two, of the bearings 37 are arranged in the region of the spindle outlet end 35 of the rotational part 3 and/or are configured as a radial bearing. This is preferably a rolling bearing, in particular a ball bearing.

In the preferred embodiment of FIG. 1, the at least one bearing 37 arranged in the region of the spindle outlet end 35 of the rotational part 3 is arranged inside the rotational part 3, in this case on an inner side of the rotational part 3. It is located between the inside of the rotational part 3 and a bearing seat 36 projecting into the inside of the rotational part 3, which is formed on a housing part 13*c*, preferably a frontal housing cover, of the housing 13.

It may also be seen from FIG. 1 that the at least one bearing 37 arranged in the region of the spindle outlet end 35 of the rotational part 3 is arranged to overlap axially with the stator 2*a* and/or the rotor 2*b* of the motor 2. In other words, the bearings 37 are located within an area enclosed by the stator 2*a* and/or rotor 2*b* of the motor 2.

In the area of the end of the rotational part 3 opposite the spindle outlet end 35 a radial bearing 39 is arranged, by means of which the rotational part is mounted relative to the housing part 13*a*.

Also (an) axial bearing(s) 38 may be provided, preferably in the area between the motor 2 and a braking device 5.

The electromechanical drive 1 also comprises, in the embodiment shown, a braking device 5 which can be actuated between a braking position and a released position and is arranged in the area of the end of the rotational part 3 opposite the spindle outlet end 35. The braking device 5 has a brake disc 6 that rotates with the rotational part 3 and a braking element 7 that is adjustable in the axial direction and acts on the brake disc 6 in the braking position (see also FIGS. 2 and 3).

It can be seen from FIG. 4 that the brake disc 6 may have an inner area 8, a friction surface area 10 extending annularly around the rotational axis 4 with a first friction surface 11 configured on a first side of the brake disc 6, and an intermediate area 9 extending between the friction surface area 10 and the inner area 8 around the rotational axis 4.

A first mating surface 17 is configured on the braking element 7, which faces the first friction surface 11 and interacts with the first friction surface 11 in the braking position.

Preferably, the motor 2 and the braking device 5 are housed in a common housing 13.

In the preferred embodiment shown, the intermediate area 9 of the brake disc 6, both in the released position and in the braking position, has no contact with the braking element 7. In the braking position, the contact of the braking element 7 with the brake disc 6 is limited to the first friction surface 11 (see FIGS. 2, 7 and 9). As can also be seen, for example, in FIG. 5, the areas of the braking element 7 adjacent to the first mating surface 17 may be set back behind the mating surface 17.

In the preferred embodiment of the brake disc 6 shown in FIG. 4, the intermediate area 9 is a deformation area which is elastically deformable in the axial direction by the action of the braking element 7 on the brake disc 6 (see FIGS. 7 and 9).

In the deformation area, as shown in FIG. 4, cut-outs 19, preferably in the form of perforations, and/or material weakenings may be formed. It is preferred if, in the deformation area, the total area of the cut-outs 19 is at least as large as the total area occupied by the remaining material.

While the embodiments according to FIGS. 5-7 have only a first friction surface and a mating surface, the variants of FIGS. 1-3 and FIGS. 8 and 9 show that the friction surface area 10 may have a second friction surface 12 configured on the second side of the brake disc 6 opposite to the first side. The friction surface area 10 of the brake disc 6 is arranged between the first mating surface 17 and a second mating surface 18 facing the second friction surface 12 and cooperating with the second friction surface 12 in the braking position.

The brake disc 6 has a disc-shaped base body 24. The first friction surface 11 and the second friction surface 12 are each formed by a preferably annular brake lining, which is applied to the base body 24 and/or projects in the axial direction beyond the base body 26 (FIG. 5-9).

The first mating surface 17 and the second mating surface 18 are each annular. Several interrupted, e.g. segment-like arranged counter surface areas would also be conceivable.

As can be clearly seen from FIG. 4, the friction surface area 10 is preferably arranged in the periphery of the brake disc 6. The first friction surface 11 and/or the second friction surface 12 may extend to the outer edge of the brake disc 6. The difference between the outer radius and the inner radius of the friction surface area 10 is preferably at most ⅓, preferably at most ¼, of the outer radius of the brake disc 6.

FIGS. 1 and 3 show that the electromechanical drive 1 has a (multi-part) housing 13. The second mating surface 18 may be formed on a housing part 13*a* or on an element that is firmly connected to the housing part 13*a*. In this way, the braking torque and the resulting frictional heat can be introduced directly into the housing.

In the embodiment shown in FIG. 4, the inner area 8 of the brake disc 6 has several, here annularly arranged, attachment interfaces 16, preferably in the form of holes, for attaching the brake disc 6 to the rotational part 3. Preferably, the number of attachment interfaces 16 is greater than 10 and/or greater than the number of cut-outs 19 in the deformation area. Due to a high number of fastening interfaces, a particularly precise adjustment of the brake disc relative to the mating surfaces is possible.

In the variants of FIGS. 6-9, in the released position of the braking device 5, the first friction surface 11 and the first mating surface 17 deviate from a parallel alignment. Similarly, the second friction surface 12 and the second mating surface 18 could deviate from a parallel alignment.

Preferably the distance between the first friction surface 11 and the first mating surface 17 decreases in the radial direction, this distance preferably being smaller at the radially outer edge of the first friction surface 11 by at most 1 mm, preferably by at most 0.2 mm, than at the radially inner edge of the first friction surface 11.

Similarly the distance between the second friction surface 12 and the second mating surface 18 decreases in the radial direction, this distance preferably being smaller at the radially outer edge of the second friction surface 12 by at most 1 mm, preferably by at most 0.2 mm, than at the radially inner edge of the second friction surface 12.

The friction surfaces and mating surfaces may be inclined to each other. The friction surfaces and mating surfaces may also have a curved shape in the radial direction.

As can be seen in particular from FIGS. 1-3, the inner area 8 of the brake disc 6 may be axially fixed to the rotational part 3. In the embodiments shown, the inner area 8 of the brake disc 6 is rigidly connected to the rotational part 3. This is done here by means of screws that protrude through the holes (attachment interfaces 16; see FIG. 4) and press the brake disc against the rotational part 3.

In the embodiment of FIG. 3, it can be seen that a first spacer ring 14 is arranged between the inner area 8 of the brake disc 6 and the rotational part 3. The inner area 8 of the brake disc 6 is also sandwiched between the first spacer ring 14 and a second spacer ring 15. This is done with the same screws as mentioned above that firmly connect the brake disc 7 to the rotational part 3.

In the preferred embodiment shown the electromechanical drive 1 is a spindle drive, wherein the rotational part 3 to which the brake disc 6 is connected is configured as a threaded nut which cooperates with the spindle 23 of the spindle drive. The lower end of the spindle 23 moves, when the motor is actuated and the threaded nut (rotational part 3) rotates, linearly downwards or upwards along the rotational axis 4 (FIG. 1).

The braking element 7 may be biased towards the braking position. Finally, FIGS. 10 and 11 show that the braking element 7 is biased towards the braking position by a plurality of springs 21 arranged in an annular manner and preferably overlapping with the first mating surface 17.

The springs 21 may be inserted in a removable housing part 13*b* (e.g. in the form of a cover or a front cover) of the electromechanical drive 1.

In FIGS. 1-3 and 10, it can be seen that the braking device 5 comprises an actuator 22, preferably in the form of an electromagnet, by means of which the braking element 6 can be brought into the released position and/or into the braking position. The actuator 22 as the springs 21 may be inserted in a removable housing part 13*b* of the electromechanical drive 1.

It can be seen from FIG. 1 that the spindle drive 1 may be a rolling spindle drive in which rolling elements 45, in particular in the form of balls, are guided in a circulating path. A first portion of the circulation path is formed between the internal thread of the rotational part 3 and the external thread of the spindle 23 and a second portion is formed by a return channel 44. In the embodiment shown, the return channel 44 is formed inside the spindle 23.

FIGS. 1 and 18 show that at the end of the rotational part 3 opposite the spindle outlet end 35, an attachment part 40 is connected to the rotational part 3, preferably the attachment part 40 having a portion located inside the rotational part 3 and/or forming a stop for the spindle 23. A portion 46 of the attachment part 40 located outside the rotational part 3 may be configured as a pin, the longitudinal axis of the pin-shaped portion 46 coinciding with the rotational axis 4 of the rotational part 3. The maximum diameter of the portion of the attachment part 40 located inside the rotation part 3 is preferably at least 3 times, preferably at least 4 times, as large as the diameter of the pin-shaped portion 46. The portion 46 of the attachment part 40 located outside the rotation part 3 is within the detection range of a sensor device 47, which is preferably a rotary encoder detecting the rotation of the attachment part 40.

A lubricant channel 41 may be configured in the attachment part 40 for supplying lubricant to the interior of the rotational part 3. The form of a first portion 42 of the lubricant channel 41, preferably in a portion 46 of the attachment part 40 located outside the rotational part 3, may be aligned with the rotational axis 4 of the rotational part 3.

The form of a second portion 43 of the lubricant channel 41 has a radial component with respect to the rotational axis 4 and/or is oblique to the rotational axis 4 (FIGS. 1 and 18). The second portion 43 of the lubricant channel 41 runs in a portion of the attachment part 40 located inside the rotation part 3 or ends at an outlet point 48, which with respect to the rotational axis 4 is located in a peripheral area of the attachment part 40.

In the embodiment shown, the attachment part 40 is surrounded by the braking device 5 of the spindle drive 1. In this case, the attachment part 40 may be disposed in a central recess of the brake disc 6 and even form a preferably positive receptacle for the brake disc 6 and thus perform a centring function for the brake disc.

On the outside of the housing 13, at least in the area of the motor 2, (e.g. removable) cooling fins 49 may be arranged.

The spindle drive 1 may have modular design, whereby a spindle drive component set may also be provided for the manufacture and/or adaptation of spindle drives. Such a component set comprises components for several electromechanical spindle drives 1. It is provided with components of various types and the components have connection interfaces for connecting the components to each other. Components of the same type have different sizes, wherein the connection interfaces of different sized components of the same type have the same dimensions.

In one example, the component set comprises first housing parts of different length and/or width, and second housing parts of different length and/or width, wherein the connection interfaces of the first housing parts for connection to the second housing parts have the same dimensions for all first housing parts and for all second housing parts.

In one example, the component set comprises rotational parts of different length and/or width, and housing parts of different length and/or width and/or motors of different length and/or width, wherein the connection interfaces of the rotational parts for connection to the housing parts and/or motors have the same dimensions for all rotational parts and/or wherein the connection interfaces of the housing parts and/or motors for connection to the rotational parts have the same dimensions for all housing parts and/or motors.

Finally, FIG. 12 shows a forming machine 20 in the form of a bending press, with at least one drive for the working movement (of a forming tool), in particular a press drive. The drive(s) are designed as electromechanical drive(s) 1 according to the invention. Such a forming machine may comprise a first (e.g. upper) tool carrier 25 (for holding at least a first forming tool 28) and a second (e.g. lower) tool carrier 26 (for holding at least a second forming tool 29), the relative movement of which is the working movement. Here, as shown in FIG. 12, the second tool carrier 26 may be stationary, while the first tool carrier 25 may be moved by the drive(s) 1. The electromechanical drive described above is particularly well suited for use in a bending machine, as the proposed braking device reacts in a particularly prompt way, thus reliably protecting the operating personnel in particular (especially in cases where a shutdown or a stop/slowdown of the working movement is relevant for safety) but also "protecting" workpieces from incorrect or faulty machining routines.

FIG. 12 shows a forming machine (in the form of a bending machine) for forming (bending) a preferably plate-type workpiece 27. The forming machine 20 comprises at least one electro-mechanical drive 1 having an electrical drive source 2 which in the embodiment according to FIG. 12 represents a press drive.

The forming machine comprises at least one forming tool 28, the working movement 32 of which is effected by the electromechanical drive 1, and at least one braking device 5, which can be actuated between a released position and a braking position, for braking and/or blocking the working movement 32 of the forming tool 28 (see FIG. 13).

In a method for forming a preferably plate-type workpiece 27 with a forming machine 20, the motor 2 of the electro-mechanical spindle drive 1 and/or the braking device 5 for forming the workpiece 27 is controlled by a control device 30.

FIGS. 14 and 15 now show schematically preferred methods for forming a workpiece 17. In FIG. 14, it may be seen that prior to a movement phase 33 of the forming tool 28, the electric drive source 2 generates a drive torque M while the braking device 5 is in the braking position, so that the braking torque B of the braking device 5 counteracts the drive torque M of the electric drive source 2. The start of the movement phase 33 of the forming tool 28 is triggered by transferring the braking device 5 to the released position and/or to a position with reduced braking torque.

In FIG. 15, it may additionally be seen that during a forming step the working movement 32 of the forming tool 28 is intermittent.

The single movement phases 33 of the working movement 32 of the forming tool 28 are shown schematically in FIG. 17. The distance travelled by the forming tool 28 during an intermittent working movement 32 is made up of the distance portions travelled during the individual movement phases 33 of the intermittent working movement 32. It may also be seen here that the direction of movement of the forming tool 28 may remain unchanged during the single movement phases 33 of an intermittent working movement 32.

Finally, FIG. 16 shows a variant in which the drive torque M of the electric drive source 2 is also generated intermittently in order to achieve an intermittent working movement.

The working movement 32 of the forming tool 28 preferably comprises several movement phases 33 during a forming step, wherein the movement phases 33 are interrupted by phases 34 in which the forming tool 28 is stationary or is moved at a lower speed than in the movement phase 33. Preferably, the length of a single movement phase 33 is less than 3 seconds, preferably less than 1.5 seconds. Preferably, the length of each phase 34 in which the forming tool 28 is stationary or is moved at a lower speed than in the movement phase 33 is less than 3 seconds, preferably less than 1.5 seconds. In this way, for example, a "hammering" action of the forming tool 28 on the workpiece 27 can be achieved.

From the variant according to FIG. 15 it may be seen that an intermittent working movement of the forming tool 28 is effected by an intermittent actuation of the braking device 5 between the released position and the braking position. The braking torque B acting on the rotational part 3 may. during those phases of the intermittent actuation of the braking device 5 in which the braking device 5 is in the braking position, be higher than the driving torque M acting on the rotational part 3. In this case, the actuation of the braking device 5 results in a (brief) stop of the forming tool 28.

The electrical drive source 2 may also generate a drive torque M during those phases of intermittent actuation of the braking device 5 in which the braking device 5 is in the braking position. For example, the drive torque M may be kept substantially constant during a forming step with intermittent working movement 32 of the forming tool 28.

From FIG. 13 as well as from the preferred embodiments of FIGS. 1 to 9 described in detail later, it may be seen that the electromechanical drive 1 comprises a rotational part 3 and the braking device 5 acts on the rotational part 3. The electrical drive source 2, which may be a motor, also acts on the rotational part 3 with its drive torque M.

In the case of an electric motor, the drive source 2 may comprise a stator 2a, e.g. connected to the housing 13 and/or stationary relative to the housing 13, and a rotor 2b, e.g. connected to the rotational part 3 or arranged directly on the rotational part 3. Corresponding supply and/or control lines lead to the electrical drive source 2.

As described in more detail later using the example of a spindle drive, the electro-mechanical drive 1 may comprise a transmission mechanism, in particular a linear drive, which converts the rotation of the rotational part 3 into a linear movement of a transmission element 23, which acts directly or indirectly on the forming tool 28. The transmission element 23 may, for example, be configured as a spindle or a toothed rack (on which a rotating gear wheel acts).

The braking device 5 is, as shown in FIG. 13 preferably, integrated in the electro-mechanical drive 1. The electrical drive source 2 and the braking device 5 may be housed in the same housing 13.

FIG. 13 also shows a control device 30 of the forming machine 20 for controlling the electric drive source 2 and the braking device 5. An operating mode 31 is stored in the control device 30, by means of which the electric drive source 2 and the braking device 5 can be controlled in such a way that the procedures described above can be carried out. The interaction between drive source 2 and braking device 5 has already been described in detail above. The (counter-)action of drive torque M and braking torque B enables the advantages mentioned in the introduction to the description.

| List of reference signs | |
|---|---|
| 1 | electromechanical drive |
| 2 | motor |
| 2a | stator |
| 2b | rotor |
| 3 | rotational part |
| 4 | rotational axis |
| 5 | braking device |
| 6 | brake disc |
| 7 | braking element |
| 8 | inner area |

-continued

| List of reference signs | |
|---|---|
| 9 | intermediate area |
| 10 | friction surface area |
| 11 | first friction surface |
| 12 | second friction surface |
| 13 | housing |
| 13a | housing part |
| 13b | housing part |
| 13c | housing part |
| 14 | first spacer ring |
| 15 | second spacer ring |
| 16 | attachment interface |
| 17 | first mating surface |
| 18 | second mating surface |
| 19 | cut-outs |
| 20 | forming machine |
| 21 | spring |
| 22 | actuator |
| 23 | spindle |
| 24 | base body |
| 25 | first tool carrier |
| 26 | second tool carrier |
| 27 | workpiece |
| 28 | forming tool |
| 29 | forming tool |
| 30 | control device |
| 31 | operating mode |
| 32 | working movement |
| 33 | movement phase |
| 34 | phase |
| 35 | spindle outlet end |
| 36 | bearing seat |
| 37 | bearing in the area of the spindle outlet end |
| 38 | axial bearing |
| 39 | radial bearing |
| 40 | attachment part |
| 41 | lubricant channel |
| 42 | first portion of the lubricant channel |
| 43 | second portion of the lubricant channel |
| 44 | return channel |
| 45 | rolling elements |
| 46 | pin-shaped portion |
| 47 | sensor device |
| 48 | outlet point |
| 49 | cooling fin |
| B | braking torque |
| M | drive torque |

The invention claimed is:

1. An electromechanical spindle drive comprising:
a housing,
a motor,
a rotational part comprising a spindle nut, wherein the rotational part is rotatable by the motor about a rotational axis,
a spindle interacting with the rotational part and comprising a, threaded section arranged within the rotational part and exiting the rotational part at a spindle outlet end, and
a plurality of bearings rotatably mounting the rotational part relative to the housing,
wherein a bearing of the plurality of bearings is arranged in a region of the spindle outlet end of the rotational part, inside the rotational part and on an inner side of the rotational part.

2. The electromechanical spindle drive according to claim 1, wherein the bearing arranged in the region of the spindle outlet end of the rotational part is arranged between an inside of the rotational part and a bearing seat projecting into an interior of the rotational part.

3. The electromechanical spindle drive according to claim 1, wherein the bearing arranged in the region of the spindle outlet end of the rotational part is arranged so as to axially overlap with at least one of a stator and a rotor of the motor or is arranged within an area enclosed by the at least one of the stator and the rotor or is arranged so as to axially overlap and be within the area enclosed by the at least one of the stator and the rotor.

4. The electromechanical spindle drive according to claim 1, wherein the bearing arranged in the region of the spindle outlet end of the rotational part is a rolling bearing.

5. The electromechanical spindle drive according to claim 1, wherein at least one bearing of the plurality of bearings is arranged in an area of an end of the rotational part opposite the spindle outlet end.

6. The electromechanical spindle drive according to claim 1, wherein at least one bearing of the plurality of bearings is an axial bearing arranged in an area between the motor and a braking device of the electromechanical spindle drive.

7. The electromechanical spindle drive according to claim 1, wherein at least one of a stator of the motor surrounds the rotational part a rotor of the motor comprises pole elements mounted on an outside of the rotational part and, the motor is a synchronous motor.

8. An electromechanical spindle drive comprising:
a housing,
a motor,
a rotational part comprising a spindle nut, wherein the rotational part is rotatable by the motor about a rotational axis,
a spindle interacting with the rotational part and comprising a threaded section arranged within the rotational part and exiting the rotational part at a spindle outlet end,
a plurality of bearings rotatably mounting the rotational part relative to the housing, and
a rolling spindle drive in which rolling elements are guided in a circulating path,
wherein a first portion of the circulating path is formed between an internal thread of the rotational part and an external thread of the spindle and a second portion of the circulating path is formed by a return channel, formed in an interior of the spindle.

9. An electromechanical spindle drive comprising:
a housing,
a motor,
a rotational part comprising a spindle nut, wherein the rotational part is rotatable by the motor about a rotational axis,
a spindle interacting with the rotational part and comprising a threaded section arranged within the rotational part and exiting the rotational part at a spindle outlet end,
a plurality of bearings rotatably mounting the rotational part relative to the housing, and
an attachment part at an end of the rotational part opposite the spindle outlet end and connected to the rotational part,
wherein a portion of the attachment part located outside the rotational part is formed in a shape of a pin,
wherein a longitudinal axis of the portion of the attachment part formed in the shape of the pin coincides with the rotational axis of the rotational part.

10. The electromechanical spindle drive according to claim 9, wherein a maximum diameter of a portion of the attachment part located inside the rotational part is at least 3 times as large as a diameter of the portion of the attachment part formed in the shape of the pin.

11. An electromechanical spindle drive comprising:

a housing, a motor, a rotational part comprising a spindle nut, wherein the rotational part is rotatable by the motor about a rotational axis, a spindle interacting with the rotational part and comprising a threaded section arranged within the rotational part and exiting the rotational part at a spindle outlet end, a plurality of bearings rotatably mounting the rotational part relative to the housing, an attachment part at an end of the rotational part opposite the spindle outlet end and connected to the rotational part, and a sensor device, wherein a portion of the attachment part located outside the rotation part is disposed in a detection range of the sensor device.

12. An electromechanical spindle drive comprising:

a housing, a motor, a rotational part comprising a spindle nut, wherein the rotational part is rotatable by the motor about a rotational axis, a spindle interacting with the rotational part and comprising a threaded section arranged within the rotational part and exiting the rotational part at a spindle outlet end, a plurality of bearings rotatably mounting the rotational part relative to the housing, an attachment part at an end of the rotational part opposite the spindle outlet end and connected to the rotational part, and a lubricant channel is configured in the attachment part for supplying lubricant to an interior of the rotational part.

13. The electromechanical spindle drive according to claim 12, wherein a path of a first portion of the lubricant channel is aligned with the rotational axis of the rotational part.

14. The electromechanical spindle drive according to claim 13, wherein a path of a second portion of the lubricant channel has a radial component with respect to the rotational axis or is oblique to the rotational axis or has a radial component with respect to the rotational axis and is oblique to the rotational axis.

15. An electromechanical spindle drive comprising:

a housing, a motor, a rotational part comprising a spindle nut, wherein the rotational part is rotatable by the motor about a rotational axis, a spindle interacting with the rotational part and comprising a threaded section arranged within the rotational part and exiting the rotational part at a spindle outlet end, a plurality of bearings rotatably mounting the rotational part relative to the housing, an attachment part at an end of the rotational part opposite the spindle outlet end and connected to the rotational part, and a braking device surrounding the attachment part.

16. The electromechanical spindle drive according to claim 1, wherein cooling fins are arranged on an outside of the housing, at least in an area of the motor, wherein the cooling fins are removable from the housing body.

17. The electromechanical spindle drive according to claim 1, comprising a modular design.

18. The electromechanical spindle drive according to claim 1, further comprising a braking device which can be actuated between a braking position and a released position, wherein the braking device acts on the rotational part.

19. The electromechanical spindle drive according to claim 1, further comprising a braking device having a brake disc that rotates with the rotational part and a braking element that can be adjusted in an axial direction and acts on the brake disc in a braking position.

20. An electromechanical spindle drive comprising:

a housing, a motor, a rotational part comprising a spindle nut, wherein the rotational part is rotatable by the motor about a rotational axis, a spindle interacting with the rotational part and comprising a threaded section arranged within the rotational part and exiting the rotational part at a spindle outlet end, a plurality of bearings rotatably mounting the rotational part relative to the housing, an attachment part at an end of the rotational part opposite the spindle outlet end and connected to the rotational part, and a braking device having a brake disc that rotates with the rotational part and a braking element that can be adjusted in an axial direction and acts on the brake disc in a braking position, wherein the brake disc has an inner area, a friction surface area extending annularly around the rotational axis with a first friction surface formed on a first side of the brake disc, and an intermediate area extending between the friction surface area and the inner area around the rotational axis, and wherein a first mating surface is formed on the braking element, which first mating surface faces the first friction surface and interacts with the first friction surface in the braking position.

21. The electromechanical spindle drive according to claim 20, wherein the intermediate area of the brake disc, both in a released position and in the braking position, is free of contact with the braking element.

22. The electromechanical spindle drive according to claim 20, wherein the intermediate area is a deformation area which is elastically deformable in the axial direction by an action of the brake element on the brake disc.

23. The electromechanical spindle drive according to claim 20, wherein the friction surface area comprises a second friction surface formed on a second side of the brake disc opposite to the first side, and wherein the friction surface area of the brake disc is arranged between the first mating surface and a second mating surface facing the second friction surface and cooperating with the second friction surface in the braking position.

24. A spindle drive component set comprising components for a plurality of electromechanical spindle drives according to claim 8, the component set comprising components of different types, the components having connection interfaces for connecting the components to one another, wherein components of a same type have different sizes, wherein the connection interfaces of differently sized components of the same type are of same dimensions.

25. The spindle drive component set according to claim 24, wherein the component set comprises:

first housing parts having at least one of a of different length and a different width, and second housing parts having at least one of a of different length and a different width, wherein the connection interfaces of the first housing parts for connection to the second housing parts have the same dimensions for all first housing parts and for all second housing parts.

26. The spindle drive component set according to claim 24 wherein the component set comprises at least one of:

rotational parts having at least one of a of different length and a different width, housing parts having at least one of a of different length and a different width, and motors having at least one of a of different length and a different width, wherein at least one of the connection interfaces of the rotational parts for connection to at least one of the housing parts and the motors have the same dimensions for all rotational parts, and the connection interfaces of at least one of the housing parts and the motors for connection to the rotational parts have the same dimensions for at least one of all of the housing parts and all of the motors.

27. A forming machine comprising:

an electromechanical drive comprising the electromechanical spindle device according to claim 8, and a forming tool whose working movement is effected by the electromechanical drive.

28. A method for forming a workpiece with a forming machine comprising the steps of:

providing the forming machine according to claim 27, and controlling the motor of the electromechanical spindle drive for forming the workpiece with a control device.

29. The electromechanical spindle drive according to claim 8, wherein a bearing of the plurality of bearings is arranged in a region of the spindle outlet end of the rotational part or is designed in a form of a radial bearing or is arranged in the region of the spindle outlet end of the rotational part and designed in the form of the radial bearing.

30. The electromechanical spindle drive according to claim 9, wherein a bearing of the plurality of bearings is arranged in a region of the spindle outlet end of the rotational part or is designed in a form of a radial bearing or is arranged in the region of the spindle outlet end of the rotational part and designed in the form of the radial bearing.

31. The electromechanical spindle drive according to claim 11, wherein a bearing of the plurality of bearings is arranged in a region of the spindle outlet end of the rotational part or is designed in a form of a radial bearing or is arranged in the region of the spindle outlet end of the rotational part and designed in the form of the radial bearing.

32. The electromechanical spindle drive according to claim 12, wherein a bearing of the plurality of bearings is arranged in a region of the spindle outlet end of the rotational part or is designed in a form of a radial bearing or is arranged in the region of the spindle outlet end of the rotational part and designed in the form of the radial bearing.

33. The electromechanical spindle drive according to claim 15, wherein a bearing of the plurality of bearings is arranged in a region of the spindle outlet end of the rotational part or is designed in a form of a radial bearing or is arranged in the region of the spindle outlet end of the rotational part and designed in the form of the radial bearing.

34. The electromechanical spindle drive according to claim 20, wherein a bearing of the plurality of bearings is arranged in a region of the spindle outlet end of the rotational part or is designed in a form of a radial bearing or is arranged in the region of the spindle outlet end of the rotational part and designed in the form of the radial bearing.

* * * * *